United States Patent
Harayama

(10) Patent No.: US 11,485,068 B2
(45) Date of Patent: Nov. 1, 2022

(54) MANUFACTURING METHOD AND SHAPING DEVICE FOR SHAPED OBJECT

(71) Applicant: MIMAKI ENGINEERING CO., LTD., Nagano (JP)

(72) Inventor: Kenji Harayama, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 114 days.

(21) Appl. No.: 16/930,330

(22) Filed: Jul. 16, 2020

(65) Prior Publication Data
US 2021/0016491 A1   Jan. 21, 2021

(30) Foreign Application Priority Data

Jul. 18, 2019   (JP) .............................. JP2019-132932

(51) Int. Cl.
| | |
|---|---|
| B29C 64/112 | (2017.01) |
| B33Y 10/00 | (2015.01) |
| B33Y 30/00 | (2015.01) |
| B29C 64/209 | (2017.01) |
| B29C 64/393 | (2017.01) |
| B33Y 50/02 | (2015.01) |

(52) U.S. Cl.
CPC .......... *B29C 64/112* (2017.08); *B29C 64/209* (2017.08); *B29C 64/393* (2017.08); *B33Y 10/00* (2014.12); *B33Y 30/00* (2014.12); *B33Y 50/02* (2014.12); *B29K 2995/002* (2013.01)

(58) Field of Classification Search
CPC ... B29C 64/112; B29C 64/209; B29C 64/393; B33Y 10/00; B33Y 30/00; B33Y 50/02; B29K 2995/0002
USPC ........................................................ 264/308
See application file for complete search history.

(56) References Cited

U.S. PATENT DOCUMENTS

2018/0326653 A1* 11/2018 Tanaka .................. B29C 64/112

FOREIGN PATENT DOCUMENTS

JP   2018187892   11/2018

* cited by examiner

*Primary Examiner* — Joseph S Del Sole
*Assistant Examiner* — Lawrence D. Hohenbrink, Jr.
(74) *Attorney, Agent, or Firm* — JCIPRNET

(57) ABSTRACT

A manufacturing method for a shaped object for manufacturing the shaped object used as a parts when creating a three-dimensional object assembled by combining multiple parts, where the shaped object including a surface region, an end region, and an inner region is shaped. A surface colored portion, which is a portion to be colored in the surface region, is formed, so that a light entering from a side opposite to the inner region is reflected by the inner region to an outside of the shaped object. And, an end colored portion, which is a portion to be colored in the end region, is formed to have a light reflectivity higher than that of the surface colored portion using a coloring material and a light reflective material.

11 Claims, 11 Drawing Sheets

MANUFACTURING METHOD AND SHAPING DEVICE FOR SHAPED OBJECT

CROSS REFERENCE TO RELATED APPLICATIONS

This application claims the priority benefit of Japanese Patent Application No. 2019-132932, filed on Jul. 18, 2019. The entirety of the above-mentioned patent application is hereby incorporated by reference herein and made a part of this specification.

TECHNICAL FIELD

The present disclosure relates to a manufacturing method and a shaping device for a shaped object.

DESCRIPTION OF THE BACKGROUND ART

A shaping device (3D printer) that shapes a shaped object using an inkjet head is conventionally known. In such a shaping device, for example, the shaped object is shaped through a layered shaping method by overlapping a plurality of layers of ink formed by an inkjet head.

In addition, in a case where the shaped object is shaped through the layered shaping method using an inkjet head, a large shaping device is usually necessary to shape a shaped object that is to become a large object. However, since a large shaping device requires a large installation space, the environment in which it can be installed is limited. Furthermore, the cost of the device may increase significantly.

On the other hand, conventionally, there is also known a method of shaping a large object by dividing it into a plurality of parts, instead of shaping the large object as it is (see e.g., Japanese Unexamined Patent Publication No. 2018-187892 (Patent Literature 1)). In this case, an object is created by combining (joining) the parts after shaping shaped objects, which are parts, with the shaping device.

Patent Literature 1: Japanese Unexamined Patent Publication No. 2018-187892

SUMMARY

When joining parts to create a large object, a boundary portion (connecting portion) of the parts may become conspicuous and the appearance of the object may be affected if the parts are simply combined. More specifically, for example, when the parts are simply combined, if the joining surface is misaligned, the color of the uncolored portion (e.g., white) at the end of the parts is visually recognized from the outside of the object and the divided surface may stand out. On the other hand, in the method disclosed in Japanese Unexamined Patent Publication No. 2018-187892, the divided surface is prevented from standing out even if misalignment occurs by coloring the end region, which becomes the joining surface of the parts, with the color in the vicinity of the dividing location.

However, the inventor of the present application has found, through further diligent research, that the influence of coloring may newly occur depending on the way of coloring the end region of the parts. More specifically, the inventor has found that, for example, in a case where the end region is colored, the portion of the end region may appear like an edge and unintended stripes or the like may be visually recognized at the joint portion as the color of the end region is visually recognized to be darker than the intended color. In this case, for example, as the colored end region appears as the outline of the parts and the connecting location of the parts is conspicuous, there is a great influence on the way the object appears. The present disclosure thus provides a manufacturing method and a shaping device for a shaped object capable of overcoming such problems.

With regards to the above problem, the inventor of the present application focused on the fact that the way the color is visually recognized is different between the surface region, which is a region corresponding to the surface of the object, and the end region in a case where the shaped object used as a parts is shaped. More specifically, usually, in the surface region, the thickness direction of the portion to be colored substantially coincides with the direction of the line of sight of the observer. In this case, the light entering the surface region from the outside of the parts is, for example, reflected by the light reflective region formed on the inner side of the surface region (interior side of the object) and reaches the eyes of the observer.

On the other hand, the end region is usually formed so that the surface thereof faces the end regions of other parts. In this case, the thickness direction of the portion to be colored in the end region becomes the direction intersecting (e.g., direction orthogonal to) the direction of the line of sight of the observer. Furthermore, as a result, the way the colors are visually recognized is different between the surface region and the end region. More specifically, it is considered that the light that passed through the end region over a distance longer than when the surface region is observed reaches the eyes of an observer observing the end region. Then, in this case, it is considered that the color of the end region is likely to be visually recognized as a color darker than the color of the surface region.

In this regard, it seems that, for example, if the end region is colored with a lighter color than the surface region, the influence of the difference in the way the color is seen can be suppressed. However, in some cases, it may be difficult to sufficiently suppress the influence of the difference in the brightness of the color as described above only by adjusting the color strength. More specifically, for example, even when coloring is performed with a light color, if light has passed over a long distance in the end region. a large amount of light may be absorbed in the end region resulting in a dark color. As a result, it may be considered that the demanded quality cannot be satisfied only by adjusting the color strength depending on the color of the parts, the quality demanded on the object created by combining the parts, and the like.

Therefore, the inventor of the present application considered to differ the way of coloring itself between the surface region and the end region in the shaped object created as a parts. More specifically, in this case, the surface region is formed, for example, on the outer side of the light reflective inner region, and color is expressed using the light reflected by the inner region. For the end region, the end region itself is given a property of reflecting light, so that color is expressed using the light reflected by the end region itself. With such configuration, for example, the distance in which the light passes through the end region can be appropriately prevented from becoming longer than necessary. In addition, this makes it possible to appropriately prevent the color of the end region from being visually recognized as a dark color and from affecting the appearance of the object in which the parts are combined.

Through further thorough researches, the inventor of the present application found features necessary for obtaining such effects and contrived the present disclosure. In order to solve the above problems, the present disclosure provides a manufacturing method for a shaped object for manufacturing a shaped object used as a parts when creating a three-dimensional object assembled by combining a plurality of the parts, where by ejecting a shaping material from an ejection head, the shaped object is shaped, the shaped object including a surface region that forms a portion of a surface of the object in a state where the object is assembled, an inner region formed at a position on an inner side of the surface region in a state where the object is assembled, and an end region that becomes a region that enters an inside of the object from an edge of the surface region in a state where the object is assembled, the end region being a region at an end on another parts side inside the object in a state where the object is assembled, at least a portion of each of the surface region and the end region is formed in a state colored using a coloring material, the inner region is formed to become a light reflective region using a light reflective material, a surface colored portion, which is a portion to be colored in the surface region, is formed so that a light entering from a side opposite to the inner region is reflected by the inner region to an outside of the shaped object, and an end colored portion, which is a portion to be colored in the end region, is formed to have a light reflectivity higher than that of the surface colored portion using the coloring material and the light reflective material.

With this configuration, for example, the surface region and the end region can be colored by different ways of coloring. Furthermore, in this case, the color can be expressed by using the light reflected by the end region itself by increasing the light reflectivity of the end colored portion in the end region. Thus, for example, the color of the end region can be appropriately prevented from being visually recognized as a dark color. Thus, with this configuration, for example, it is possible to appropriately prevent the appearance of the object in which the parts are combined from being affected. In addition, for example, this makes it possible to more appropriately shape a shaped object used as a parts of an object.

Here, the end colored portion in the end region is, for example, at least a portion of a portion that lies along the edge of the surface region in the end region. Furthermore, in this case, for example, the end colored portion is connected to the surface colored portion at the edge of the surface region. In this case, it is conceivable that the portion connected to the surface colored portion in the end colored portion is formed in a state of being colored in accordance with the color of the surface colored portion at the edge of the surface region.

Further, in this configuration, the way of coloring the surface colored portion can be considered as, for example, a method of surface color method (surface coloring method) which is a method in which coloring is performed on the surface that overlaps a light reflective inner region. In this case, the surface colored portion can be considered as, for example, a region where a color is visually recognized as the color of the inner region functions as a background color. Furthermore, the way of coloring the end colored portion can be considered as, for example, a method of bulk color method (bulk coloring method) which is a method in which coloring is performed on the region without using other light reflective regions. In this case, the end colored portion can be considered as, for example, a region where a color is visually recognized as the color of the light reflective material in the end colored portion functions as a background color. Moreover, the shaped object used as a parts of the object can be more appropriately colored by forming such a surface colored portion and an end colored portion.

Further, in this configuration, it is conceivable to use as the ejection head, for example, a plurality of coloring heads that respectively eject the coloring materials of different colors, a light reflective material head that ejects the light reflective material, and a clear material head that ejects a clear color material. In this case, the clear color can be considered as, for example, a colorless and transparent color, or the like. Furthermore, an ultraviolet curable ink or the like can be suitably used as the shaping material. In this case, the ink can be considered as, for example, a functional liquid or the like. Furthermore, an inkjet head or the like can be suitably used as the ejection head.

In addition, in this case, it is conceivable to form the surface colored portion using, for example, the coloring material selected according to a color to be colored and the clear color material. Furthermore, it is conceivable to form the end colored portion using, for example, the coloring material selected according to a color to be colored and the light reflective material. With this configuration, for example, the surface colored portion and the end colored portion can be appropriately formed. Moreover, it is also conceivable to form the end colored portion by further using a clear color material.

Furthermore, more specifically, in this case, each portion of the surface colored portion is formed so that a total amount of the coloring material and the clear color material per unit volume becomes constant, for example, by differing the coloring material used according to a color to be colored and changing a usage amount of the clear color material in accordance with change in usage amount of the coloring material caused by difference in color. Moreover, each portion of the end colored portion is formed so that a total amount of the coloring material and the light reflective material per unit volume becomes constant, for example, by differing the coloring material used according to a color to be colored and changing a usage amount of the light reflective material in accordance with at least a portion of the change in the usage amount of the coloring material caused by difference in color. With this configuration, for example, the surface colored portion and the end colored portion can be appropriately formed. Furthermore, it is conceivable that the surface colored portion and the end colored portion are colored, for example, at a resolution same as the resolution of shaping. In this case, the resolution pf shaping is the resolution of the position where the shaping material is ejected by the ejection head.

Furthermore, it is conceivable to color the end colored portion at, for example, a resolution lower than the resolution of shaping. More specifically, in this case, it is conceivable to perform coloring in units of color cells each having a size in which a plurality of dots formed by droplets of a shaping material are combined. In this case, the end colored portion is formed, for example, by arranging a plurality of color cells set in advance as a unit of coloring. It is considered to use, as a color cell, a configuration including a reflective core which is a portion formed by the light reflective material inside the color cell, and an outer peripheral portion which is a portion that surrounds a periphery of the reflective core. In this case, the outer peripheral portion is formed to indicate a color of the color cell by using the coloring material of each color as necessary. According to such a configuration, for example, the end colored portion can be appropriately formed using a light reflective material. Furthermore, the light reflective material can be uniformly distributed to the end colored portion by forming the reflective core of each color cell with a light reflective material.

Furthermore, in this case, it is conceivable to color the end colored portion at a resolution determined according to a size of the color cell. Moreover, it is conceivable to color the surface colored portion at a resolution higher than that of the end colored portion by, for example, performing coloring at the resolution same as the resolution of shaping. With this configuration, for example, the end colored portion can be appropriately colored using the color cell while coloring a portion that forms the surface of the object at a high resolution.

In this configuration, it is conceivable to designate the way of coloring each of the surface colored portion and the end colored portion using coloring method designating data, which is data indicating a way of coloring each position of the shaped object. In this case, indicating the way of coloring means, for example, indicating which method, the surface color method or the bulk color method, to use for coloring. Furthermore, in this case, a way of coloring the surface colored portion and a way of coloring the end colored portion are made different based on the coloring method designating data. With this configuration, for example, the way of coloring each of the surface colored portion and the end colored portion can be appropriately designated.

Furthermore, in this case, it is conceivable to use as the coloring method designating data, for example, data in the same format as the shaping data indicating the shaped object. In this case, the shaping data can be considered as data indicating shape and color of the shaped object to be shaped, and the like. Furthermore, in this case, the shaping data indicates a color to be colored for each position of the surface colored portion and the end colored portion. In addition, as the coloring method designating data, for example, data indicating the shape of the shaped object and the color associated with at least a portion of the shaped object in the same format as the shaping data is used. Moreover, as the color indicated by the coloring method designating data, for example, a color that is associated in advance with the way of coloring is used. In this case, regarding the color indicated by the coloring method designating data, for example, it can be considered that the way of coloring with respect to a position designated with the color is indicated.

More specifically, it is conceivable to use as the coloring method designating data, for example, data that indicates the shape of the shaped object and in which a first color is set to the position where the coloring by the surface color method is to be performed and a second color is set to the position where the coloring by the bulk color method is to be performed. In this case, different colors are used as the first color and the second color. With this configuration, for example, one shaped object can be colored through different methods depending on the position. Thus, for example, the way of coloring for the surface colored portion and the end colored portion can be appropriately made different.

Use of a shaping device having the features similar to the above, and the like can be considered for the configuration of the present disclosure. In this case as well, for example, effects similar to the above can be obtained.

According to the present disclosure, for example, a shaped object used as a parts of an object can be shaped more appropriately.

BRIEF DESCRIPTION OF THE DRAWINGS

FIG. 2A shows an example of a structure of the shaping system 10. FIG. 2B shows an example of a structure of a main portion of a shaping device 12. FIG. 2C shows an example of a configuration of a head portion 102.

FIG. 3A shows an example of two shaped objects 50 used as parts. FIG. 3B shows an object 40 created by combining the two shaped objects 50.

FIG. 4A shows an example of the positional relationship of the respective regions forming the shaped object 50. FIG. 4B shows another example of the positional relationship of the respective regions forming the shaped object 50. FIG. 4C shows various examples of a way of forming a boundary portion between the surface region 502 and the end region 504.

FIG. 5A shows an example of a way of coloring the surface region 502. FIG. 5B shows an example of a way of coloring the end region 504.

FIG. 6A shows an example of a way the color of the surface region 502 is seen. FIG. 6B is a view describing the influence of the angle at which the surface region 502 is observed. FIG. 6C shows an example of how the color of the end region 504 is seen.

FIG. 7A shows an example of the operation until immediately before the shaping of the shaped object 50 is started in the shaping device 12. FIG. 7B shows an example of an operation of performing shaping of the shaped object 50 in the shaping device 12. FIG. 7C shows an example of the operation after the shaping of the shaped object 50 by the shaping device 12 is completed.

FIG. 10A shows an example of the configuration of the end region 504 when coloring is performed using a color cell 300. FIG. 10B shows an example of a configuration of the color cell 300.

FIG. 11A and FIG. 11B schematically show the color cell 300 from various viewpoints.

DESCRIPTION OF EMBODIMENTS

Figure 1:
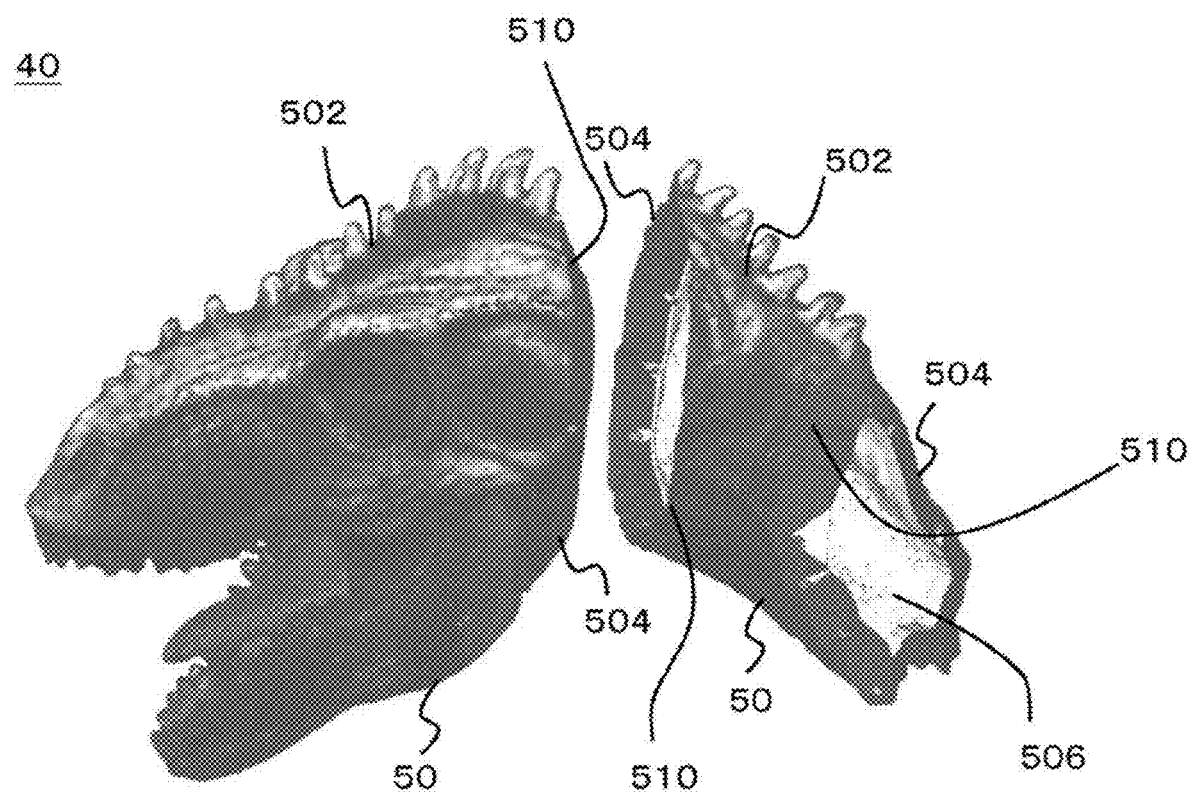
FIG. 1 is a view showing an example of a shaped object 50 manufactured by a manufacturing method for a shaped object according to one embodiment of the present disclosure.

Hereinafter, an embodiment according to the present disclosure will be described with reference to the drawings. FIG. 1 is a view showing an example of a shaped object 50 manufactured by a manufacturing method for a shaped object according to an embodiment of the present disclosure, and shows an example of a configuration of a plurality of shaped objects 50 used as parts when creating a three-dimensional object 40 assembled by assembling a plurality of parts.

Furthermore, more specifically, the object 40 shown in FIG. 1 is an object showing a model of a dinosaur. The plurality of shaped objects 50 are parts that form a portion of this model. A large object 40 can be appropriately created, for example, by creating the object 40 by dividing it into a plurality of parts. Moreover, in the present example, each shaped object 50 has a surface region 502, an end region 504, and an inner region 506.

The surface region 502 is a region that forms a portion of the surface of the object 40 in a state where the object 40 is assembled. Furthermore, in the present example, at least a portion of the surface region 502 is formed in a colored state using the coloring ink. With this configuration, for example, the colored object 40 can be appropriately created. The way of coloring the surface region 502 will be described in more detail later.

The end region 504 is a region that becomes an end on another parts (shaped object 50) side inside the object 40 in a state where the object 40 is assembled. The end region 504 can also be considered as, for example, a region that forms a boundary with other parts. In this case, the region that forms a boundary with another parts is, for example, a region including at least a portion of the surface of the shaped object 50 on another parts side. Furthermore, in the present example, the end region 504 is a region that comes into contact with other parts. In the modified example of the configuration of the object 40 or the shaped object 50, the end region 504 may be, for example, a region that does not come into contact other parts. Furthermore, in the present example, the end region 504 is formed so as to be connected to the surface region 502 at an edge 510 of the surface region 502. In this case, the end region 504 can be considered as, for example, a region that enters the inside of the object 40 from the edge 510 of the surface region 502 in a state where the object 40 is assembled. Furthermore, the end region 504 can be considered as, for example, a surface obtained by dividing the object 40.

In the present example, at least a portion of the end region 504 is also formed in a colored state using the coloring ink. With such a configuration, for example, even when misalignment occurs at the joining surface connecting the plurality of shaped objects 50, and the like, the color of the uncolored portion inside the shaped object 50 can be appropriately prevented from being visually recognized from outside the object 40. In addition, this makes it possible to, for example, appropriately prevent the divided surface of the shaped object 50 used as a parts from standing out. Furthermore, in the present example, the way of coloring the end region 504 is different from the way of coloring the surface region 502. A way of coloring the end region 504 will also be described in more detail later.

The inner region 506 is a region formed at a position on the inner side of the surface region 502 in a state where the object 40 is assembled. The inner region 506 can also be considered as, for example, a region other than the surface region 502 and the end region 504 in the shaped object 50. Furthermore, in the present example, the inner region 506 is formed using white ink so as to be a light reflective region.

Figure 2A:
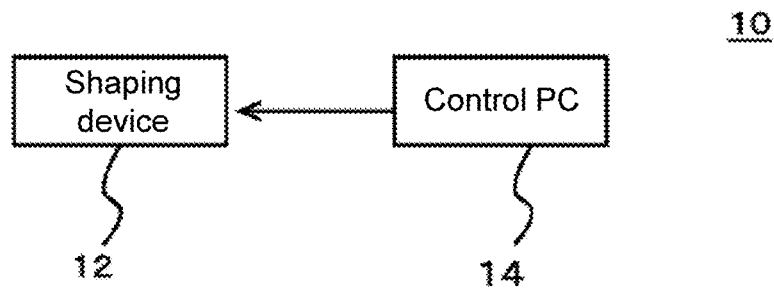
FIG. 2A to FIG. 2C are views describing a shaping system 10 that shapes a shaped object 50.
Figure 2B:
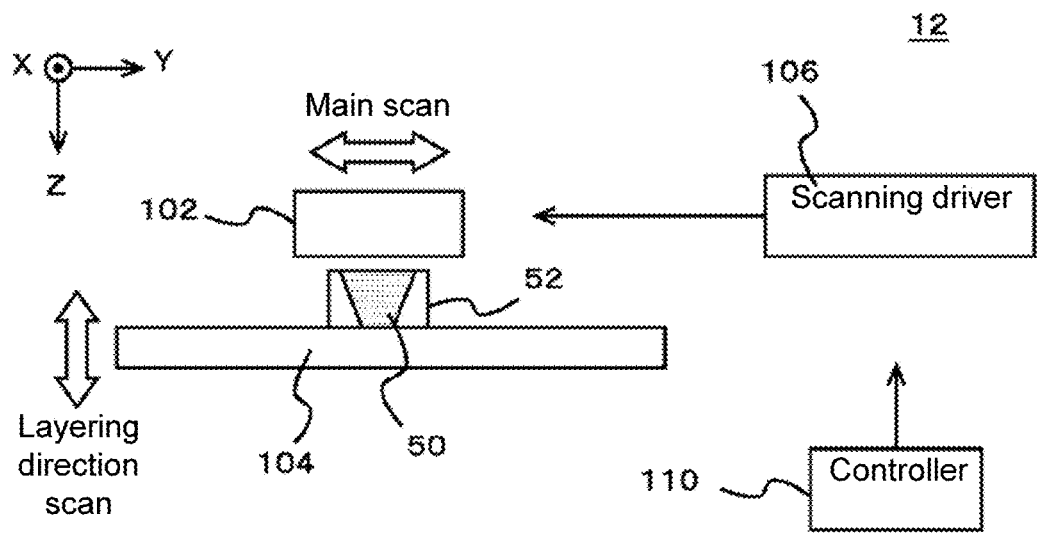
Figure 2C:
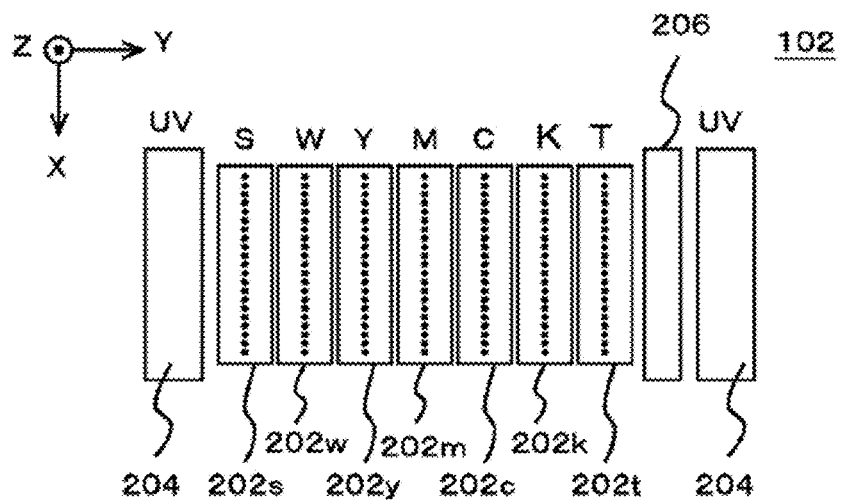

Furthermore, in the present example, the shaped object 50 is shaped by a layered shaping method in which ink layers are layered. FIG. 2A to FIG. 2C are views describing a shaping system 10 that shapes the shaped object 50. FIG. 2A shows an example of a structure of the shaping system 10. In the present example, the shaping system 10 is a shaping system for shaping a three-dimensional shaped object 50, and includes a shaping device 12 and a control PC 14.

The shaping device 12 is an apparatus (3D printer) for shaping a three-dimensional shaped object by the layered shaping method, and shapes the shaped object according to the control of the control PC 14. In this case, the layered shaping method is, for example, a method of shaping the shaped object by overlapping a plurality of layers. Furthermore, the shaped object can be considered as, for example, a stereoscopic three-dimensional structural object shaped by the shaping device 12. Moreover, in the present example, the shaping device 12 is a full-color shaping device capable of shaping a shaped object colored in full color, and receives input data indicating a shaped object to be shaped from the control PC 14 and shapes the shaped object based on such input data. More specifically, the shaping device 12 generates slice data indicating a cross-section of the shaped object based on the input data, and ejects ink according to the slice data to form respective ink layers that form the shaped object.

The control PC 14 is a computer (host PC) that controls the operation of the shaping device 12, and controls the shaping operation of the shaping device 12 by providing input data to the shaping device 12. In this case, the control PC 14 provides, for example, input data indicating a shaped object in which at least one portion is colored to the shaping device 12. Furthermore, more specifically, in the present example, the control PC 14 provides the input data indicating a shaped object in which coloring is performed on the surface, where hue can be visually recognized from the outside, to the shaping device 12.

As described above, in the present example, the shaping system 10 is configured by the shaping device 12 and the control PC 14, which are a plurality of devices. However, in a modified example of the shaping system 10, the shaping system 10 may be configured by a single device. In this case, for example, it is conceivable to configure the shaping system 10 with a single shaping device 12 also having the function of the control PC 14. The shaping system 10 may further include devices other than the shaping device 12 and the control PC 14.

Furthermore, in the present example, the shaping device 12 has, for example, the configuration shown in FIG. 2B. FIG. 2B shows an example of a structure of a main portion of the shaping device 12. In the present example, the shaping device 12 includes a head portion 102, a shaping table 104, a scanning driver 106, and a controller 110. Other than the points described below, the shaping device 12 may have a structure identical or similar to a known shaping device. More specifically, other than the points described below, the shaping device 12 may have a feature identical or similar to a known shaping device that carries out shaping by ejecting a droplet to become the material of the shaped object 50 using an inkjet head. Furthermore, other than the illustrated configuration, the shaping device 12 may further include, for example, various types of configurations necessary for the shaping, and the like of the shaped object 50.

The head portion 102 is a portion that ejects the material of the shaped object 50. Furthermore, in the present example, ink is used as the material of the shaped object 50. In this case, for example, the ink can be considered as a functional liquid or the like. Moreover, in the present example, for example, liquid, and the like ejected from the inkjet head can also be considered as the ink. More specifically, the head portion 102 ejects ink that cures according to predetermined conditions from a plurality of inkjet heads as a material of the shaped object 50. Then, the respective layers forming the shaped object 50 are overlapped and formed by curing the ink after landing to shape the shaped object 50 by the layered shaping method. Moreover, in the present example, an ultraviolet-curable ink (UV ink) that cures from a liquid state by irradiation of ultraviolet light is used as the ink. Furthermore, the head portion 102 further ejects a material of a support layer 52 in addition to the material of the shaped object 50. The head portion 102 thereby forms the support layer 52 at a periphery of the shaped object 50, and the like as necessary. The support layer 52 is, for example, a layered structural object that supports at least a portion of the shaped object 50 being shaped. The support layer 52 is formed as necessary at the time of shaping the shaped object 50 and removed after the shaping is completed.

The shaping table 104 is a table-shaped member that supports the shaped object 50 being shaped, and is disposed at a position facing the inkjet head in the head portion 102, and mounts the shaped object 50 being shaped on the upper surface thereof. Furthermore, in the present example, the shaping table 104 has a configuration in which at least the upper surface is movable in a layering direction (Z direction in the figure), and moves at least the upper surface in accordance with the progress of the shaping of the shaped object 50 by being driven by the scanning driver 106. In this case, the layering direction means, for example, a direction in which the material of the shaped object is layered in the layered shaping method. More specifically, in the present example, the layering direction is a direction orthogonal to a main scanning direction (Y direction in the drawing) and a sub scanning direction (X direction in the drawing) set in advance in the shaping device 12.

The scanning driver 106 is a driver that causes the head portion 102 to perform a scanning operation of relatively moving with respect to the shaped object 50 being shaped. In this case, "relatively moving with respect to the shaped object 50 being shaped" means, for example, relatively moving with respect to the shaping table 104. To cause the head portion 102 to perform the scanning operation means, for example, to cause the inkjet head of the head portion 102 to perform the scanning operation. Furthermore, in the present example, the scanning driver 106 causes the head portion 102 to perform the main scan (Y scanning), the sub scan (X scanning), and the layering direction scan (Z scanning).

The main scan is, for example, an operation of ejecting ink while relatively moving in the main scanning direction with respect to the shaped object 50 being shaped. In this example, the scanning driver 106 causes the head portion 102 to perform the main scan by fixing the position of the shaping table 104 in the main scanning direction and moving the head portion 102 side. Furthermore, for example, the scanning driver 106 may move the shaped object 50 side by fixing the position of the head portion 102 in the main scanning direction and moving, for example, the shaping table 104. The sub scan means, for example, an operation of relatively moving with respect to the shaped object 50 being shaped in the sub scanning direction orthogonal to the main scanning direction. More specifically, the sub scan is, for example, an operation of relatively moving with respect to the shaping table 104 in the sub scanning direction by a feed amount set in advance. In the present example, the scanning driver 106 causes the head portion 102 to perform the sub scan between the main scans by fixing the position of the head portion 102 in the sub scanning direction and moving the shaping table 104. Furthermore, the scanning driver 106 may cause the head portion 102 to perform the sub scan by fixing the position of the shaping table 104 in the sub scanning direction and moving the head portion 102.

The layering direction scan is, for example, an operation of relatively moving the head portion 102 in the layering direction with respect to the shaped object 50 being shaped. In addition, the scanning driver 106 adjusts the relative position of the inkjet head with respect to the shaped object 50 being shaped in the layering direction by causing the head portion 102 to perform the layering direction scan in accordance with the progress of the shaping operation. More specifically, in the layering direction scan of the present example, the scanning driver 106 fixes the position of the head portion 102 in the layering direction and moves the shaping table 104. The scanning driver 106 may fix the position of the shaping table 104 in the layering direction and move the head portion 102.

The controller 110 has a configuration including, for example, a CPU of the shaping device 12, and controls the shaping operation of the shaped object 50 by controlling each portion of the shaping device 12. Furthermore, in the present example, the controller 110 generates slice data based on the input data received from the control PC 14. In this case, the slice data can be considered as, for example, data indicating the cross-section of the shaped object 50 at each position in the layering direction. Furthermore, in the present example, the controller 110 generates a plurality of pieces of slice data corresponding to a plurality of ink layers that form the shaped object 50. Then, in the operation of forming respective ink layers that form the shaped object 50, the controller 110 controls the operation of each inkjet head in the head portion 102, for example, to cause each inkjet head to eject the ink to use for the shaping of the shaped object 50. According to this example, the operation of shaping the shaped object 50 in the shaping device 12 can be appropriately executed.

Furthermore, in the present example, the head portion 102 in the shaping device 12 has, for example, a configuration shown in FIG. 1C. FIG. 2C shows an example of a configuration of the head portion 102. In the present example, the head portion 102 includes a plurality of inkjet heads, a plurality of ultraviolet light sources 204, and a flattening roller 206. As shown in the drawing, the plurality of inkjet heads include an inkjet head 202s, an inkjet head 202w, an inkjet head 202y, an inkjet head 202m, an inkjet head 202c, an inkjet head 202k, and an inkjet head 202t. The plurality of inkjet heads are, for example, one example of an ejection head that ejects the material of shaping, and are disposed side by side in the main scanning direction with their positions in the sub scanning direction aligned. Furthermore, each inkjet head includes a nozzle row, in which a plurality of nozzles are lined in a predetermined nozzle row direction, on a surface facing the shaping table 104. Moreover, in the present example, the nozzle row direction is a direction parallel to the sub scanning direction.

Among these inkjet heads, the inkjet head 202s is an inkjet head that ejects the material of the support layer 52. For example, a known material for the support layer can be suitably used for the material of the support layer 52. The inkjet head 202w is an inkjet head that ejects ink of white color (W color). In this case, the inkjet head 202w is an example of a head for light reflective material. White ink is an example of a light reflective material.

The inkjet head 202y, the inkjet head 202m, the inkjet head 202c, and the inkjet head 202k (hereinafter referred to as the inkjet heads 202y to 202k) are inkjet heads for coloring used at the time of shaping the colored shaped object 50. More specifically, the inkjet head 202y ejects ink of yellow color (Y color). The inkjet head 202m ejects ink of magenta color (M color). The inkjet head 202c ejects ink of cyan color (C color). Furthermore, the inkjet head 202k ejects ink of black color (K color). In addition, in the present example, each color of YMCK is an example of a process color used for full color representation by subtractive color mixing method. Moreover, these inks of each color are one example of a coloring material. In this case, the coloring material can be considered as, for example, a material or the like used to color a region (region to be colored) to be colored in the shaped object 50 to a desired color. Furthermore, each of the inkjet heads 202y to 202k is an example of a coloring head that ejects coloring materials of colors different from each other.

The inkjet head 202t is an inkjet head that ejects a clear ink. The clear ink is, for example, an ink of colorless and transparent (T) clear color. Furthermore, clear ink is an example of a clear color material which is an uncolored translucent material. Moreover, in the present example, the inkjet head 202t is also an example of a clear material head.

The plurality of ultraviolet light sources 204 are light sources (UV light sources) for curing ink, and generate an ultraviolet light that cures the ultraviolet-curable ink. Moreover, in the present example, each of the plurality of ultraviolet light sources 204 is disposed on one end side and the other end side in the main scanning direction in the head portion 102 so as to sandwich the plurality of inkjet heads in between. For example, UVLED (ultraviolet LED) and the like can be suitably used for the ultraviolet light source 204. Furthermore, it is also conceivable to use a metal halide lamp, a mercury lamp, and the like for the ultraviolet light source 204. The flattening roller 206 is a flattening portion for flattening the ink layer formed during the shaping of the shaped object 50. The flattening roller 206, for example, flattens the ink layer by coming into contact with a surface of the ink layer and removing a portion of the ink before being cured at the time of the main scan.

The ink layer that forms the shaped object 50 can be appropriately formed by using the head portion 102 having the configuration described above. Furthermore, the shaped object 50 can be appropriately shaped by forming a plurality of ink layers in an overlapping manner. Moreover, the specific configuration of the head portion 102 is not limited to the configuration described above, and can be variously modified. For example, the head portion 102 may further include an inkjet head for a color other than the above as an inkjet head for coloring. Furthermore, the arrangement of a plurality of inkjet heads in the head portion 102 can be variously modified. For example, the positions in the sub scanning direction of some inkjet heads may be shifted from the other inkjet heads.

Figure 3A:
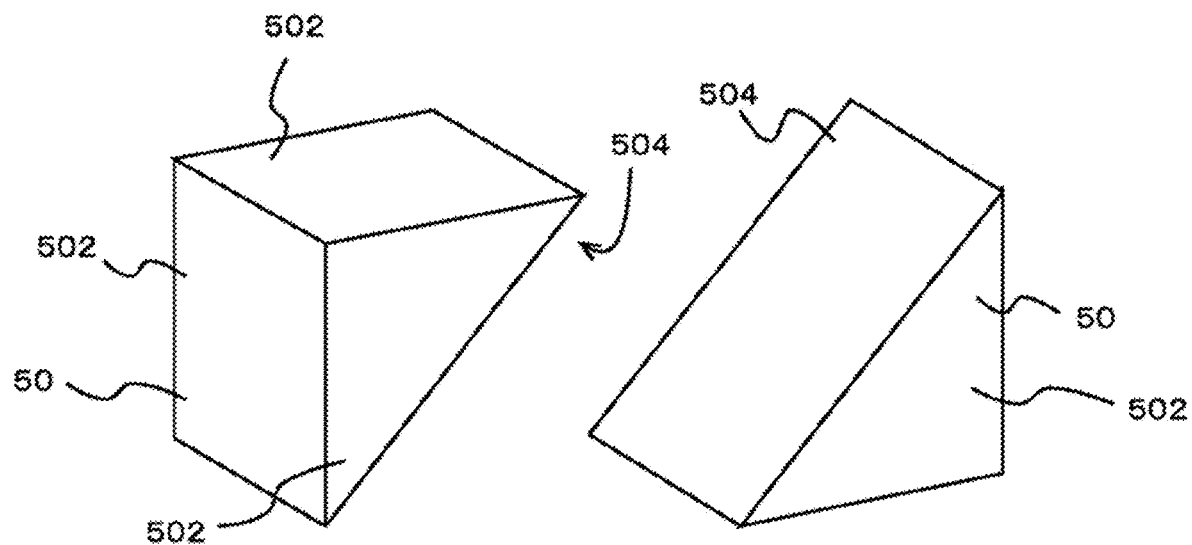
FIG. 3A and FIG. 3B are views showing an example of a configuration of the shaped object 50 in a simplified manner.
Figure 3B:
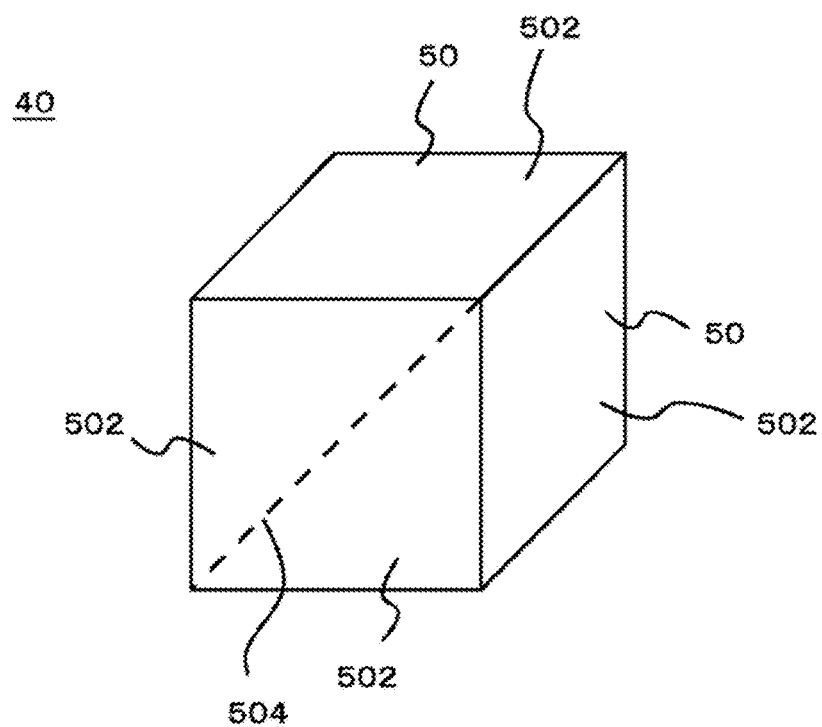

Next, the features of the shaped object 50 used as parts of the object 40 in the present example will be described in more detail. FIG. 3A and FIG. 3B are views showing an example of a configuration of the shaped object 50 in a simplified manner, and shows one example of a configuration of the shaped object 50 used as parts for a case where the three-dimensional object 40 is created by combining two shaped objects 50. FIG. 3A shows an example of the two shaped objects 50 used as parts. FIG. 3B shows the object 40 created by combining two shaped objects 50. Furthermore, the object 40 and the shaped object 50 shown in FIG. 3A and FIG. 3B can be considered as, for example, examples of the object 40 and the shaped object 50 that show targets different from those in FIG. 1. Other than the points described above and below, in FIG. 3A and FIG. 3B, the configuration denoted with the same reference numeral as FIG. 1 may have a feature identical or similar to the configuration in FIG. 1. Furthermore, hereinafter, a case where the object 40 and the shaped object 50 shown in FIG. 3A and FIG. 3B are used will be referred to as the present example.

As described above, in the shaped object 50 of the present example, the portion that forms a portion of the surface of the object 40 in a state where the object 40 is assembled becomes the surface region 502. Furthermore, a region that becomes an end on another parts (shaped object 50) side inside the object 40 in a state where the object 40 is assembled becomes the end region 504. Moreover, in FIG. 3A and FIG. 3B, it is a region hidden inside the shaped object 50, but the region on the inner side of the surface region 502 becomes the inner region 506. In this case, in a state where the object 40 is assembled, the surface of the object 40 is configured by the surface region 502 of the shaped object 50 as shown in FIG. 3B.

However, as described above, at the time of combining the shaped object 50, for example, there is a case where a portion of the end region 504 of the shaped object 50 is visually recognized from the outside of the object 40 when misalignment occurs at the joining surface of the shaped object 50. Furthermore, as a result, the color of the end region 504 may affect the appearance of the object 40. More specifically, for example, when the end region 504 is not colored and is formed as a white region like the inner region 506, the color of the end region 504 is visually recognized from the outside of the object 40, and the joining surface may stand out. On the other hand, in the present example, the end region 504 is also colored to reduce the influence of the conspicuous divided surface even when misalignment occurs at the joining surface. In this case, the end region 504 may be colored with the same or similar color as the surface region 502.

Furthermore, even in a case where the end region 504 is colored, if the end region 504 is simply colored in the same manner as the surface region 502, for example, the color of the end region 504 may appear as a dark color. Furthermore, as a result, even if the end region 504 is colored, the joining surface may be conspicuous when misalignment occurs at the joining surface, and the like. Therefore, in the present example, the way of coloring the end region 504 is different from the way of coloring the surface region 502, as will be described in detail below. Thus, the joining surface is more appropriately prevented from standing out when misalignment occurs at the joining surface, and the like.

Figure 4A:
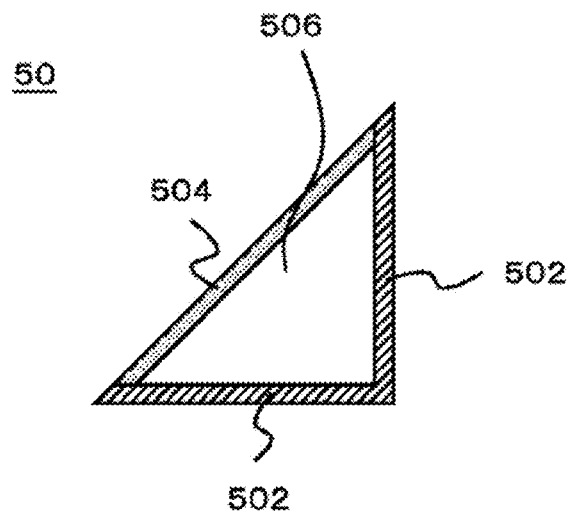
FIG. 4A to FIG. 4C are views describing the positional relationship of respective regions forming the shaped object 50.
Figure 4B:
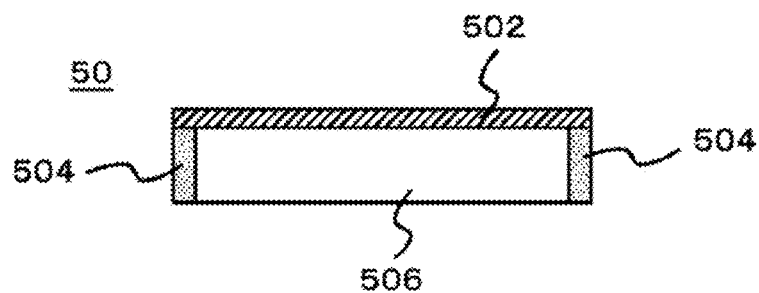
Figure 4C:
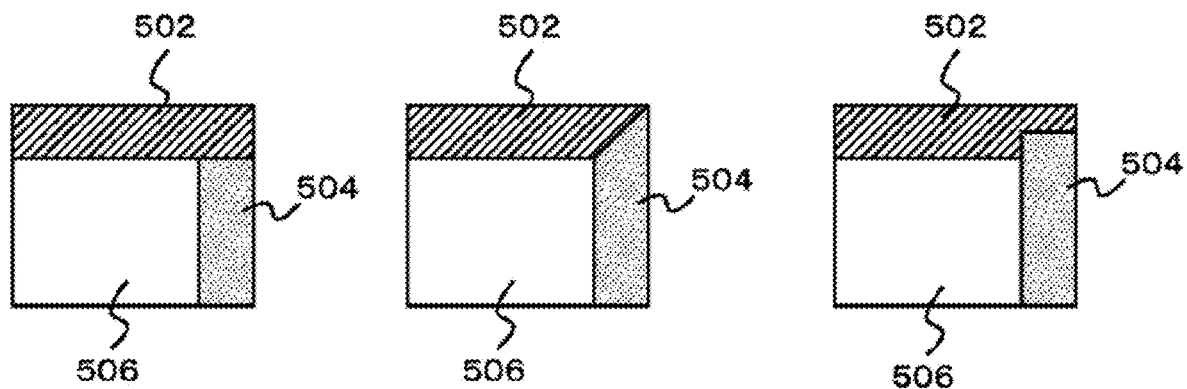

FIGS. 4A, 4B, 4C, 5A and 5B are views describing the way of coloring the surface region 502 and the end region 504. First, the position of each region forming the shaped object 50 will be described in more detail. FIG. 4A to FIG. 4C are views describing the positional relationship between the respective regions forming the shaped object 50. FIG. 4A is a view showing an example of the positional relationship of the respective regions forming the shaped object 50, and shows an example of a configuration of a cross-section of the shaped object 50 for one of the shaped objects 50 shown in FIG. 3A and FIG. 3B. Furthermore, for the sake of convenience of illustration, in FIG. 4A, FIG. 4B and FIG. 4C, different hatching patterns are shown for different ways of coloring.

As described above, in the present example, the shaped object 50 has the surface region 502, the end region 504, and the inner region 506. Then, in this case, the surface region 502 is formed with a constant thickness, for example, at a position on the surface of the shaped object 50 that configures the surface (outer surface) of the object 40. Furthermore, the end region 504 is formed with a constant thickness, for example, at a position on the surface of the shaped object 50 other than the range where the surface region 502 is formed. Forming the surface region 502 and the end region 504 with a constant thickness means that the surface region 502 and the end region 504 are formed with a substantially constant thickness according to the resolution of shaping and the like. Moreover, forming with a constant thickness can be considered as, for example, forming the region such that the difference from the reference thickness falls within a certain allowable range. In this case, a portion other than the surface region 502 and the end region 504 in the shaped object 50 becomes the inner region 506. Furthermore, in the case shown in FIG. 4A, the inner region 506 can also be considered as, for example, a region other than the surface of the shaped object 50.

Furthermore, the positional relationship of the respective regions forming the shaped object 50 may be different from the above depending on the configuration of the object 40. FIG. 4B is a view showing another example of the positional relationship of the respective regions forming the shaped object 50, and shows an example of a configuration of a cross-section of the shaped object 50 for the shaped object 50 having a shape different from the shaped object 50 shown in FIG. 3A and FIG. 3B.

When the shaped object 50 is used as a parts of the object 40, a portion of the surface of the shaped object 50 may become a portion that is not visible from the outside of the object 40 depending on the shape of the object 40 or the shaped object 50. In such a case, a portion of the surface of the shaped object 50 may be formed without coloring.

In this case as well, it is conceivable to form the surface region 502 with a constant thickness, for example, at a position on the surface of the shaped object 50 that forms the surface (outer surface) of the object 40. Furthermore, it is also conceivable to form the end region 504 with a constant thickness, for example, at a position of a portion of the surface of the shaped object 50 other than the range where the surface region 502 is formed. Moreover, it is conceivable to form the inner region 506, for example, at a position other than the surface region 502 and the end region 504, including a portion of the surface of the shaped object 50.

Furthermore, FIG. 4A and FIG. 4B illustrate a configuration for a case where priority is given to forming the surface region 502 with a constant thickness for the boundary portion between the surface region 502 and the end region 504. However, various configurations can be used for the way of forming the boundary portion between the surface region 502 and the end region 504.

FIG. 4C shows various examples of the way of forming the boundary portion between the surface region 502 and the end region 504. In FIG. 4C, the leftmost view shows an example of a case where a boundary portion is formed similar to the case shown in FIG. 4A and FIG. 4B. In this case, the surface region 502 is formed with a constant thickness at the position forming the surface (outer surface) of the object 40, including the boundary portion with the end region 504. With this configuration, for example, the surface region 502 can be formed on the entire surface of the object 40 under the same conditions.

In addition, in FIG. 4C, the central view shows an example of a case where the boundary portion between the surface region 502 and the end region 504 is formed so as to be divided into the surface region 502 and the end region 504. More specifically, in this case, a portion of the surface region 502 connecting to the end region 504 is formed such that the thickness gradually decreases toward the end. Furthermore, in this case, it can be considered that the thickness gradually decreases toward the end for a portion of the end region 504 connecting to the surface region 502. With this configuration, for example, the boundary between the surface region 502 and the end region 504 can be made inconspicuous, and the surface region 502 and the end region 504 can be connected more naturally.

Furthermore, as will be described in more detail later, in the present example, the end region 504 is colored so that the region itself has light reflectivity. In this case, it can be considered that the end region 504 formed on the inner side (back side) of the surface region 502 at the boundary portion between the surface region 502 and the end region 504 becomes a region to be colored that also has a function as a light reflecting region. In this case, the end region 504 can be used as a light reflecting region in the vicinity of the boundary portion between the surface region 502 and the end region 504.

Moreover, in this case, the thickness of the surface region 502 is preferably adjusted in consideration of the color colored in the end region 504. Therefore, in the surface region 502, the thickness of the portion overlapping the end region 504 may be different from that of the other portions. More specifically, in this case, it is considered to slightly decrease the thickness of the surface region 502, and the like at the boundary portion between the surface region 502 and the end region 504. In this case, for example, it is conceivable to form the boundary portion as shown in the rightmost drawing in FIG. 4C.

In FIG. 4C, the rightmost view shows an example of a case where the boundary portion is formed such that the thickness of the surface region 502 becomes smaller than that of the other portions at the boundary portion between the surface region 502 and the end region 504. In this case, the end region 504 is formed so as to enter the surface region 502 by an amount corresponding to the reduced thickness of the surface region 502. With this configuration, for example, the thickness of the surface region 502 can be appropriately adjusted in consideration of the color of the end region 504.

Figure 5A:
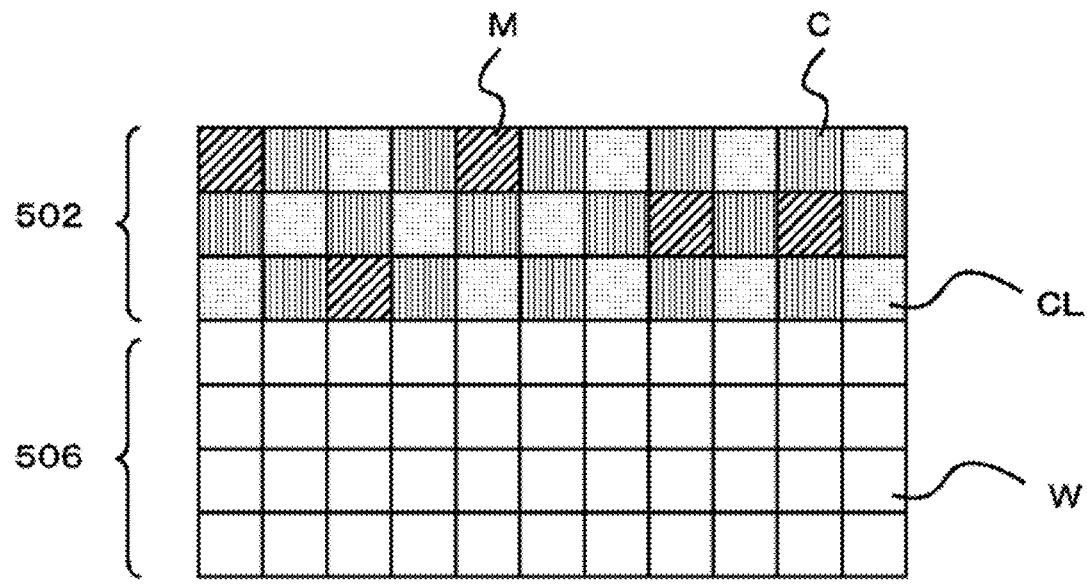
FIG. 5A and FIG. 5B are views describing way of coloring the surface region 502 and the end region 504.
Figure 5B:
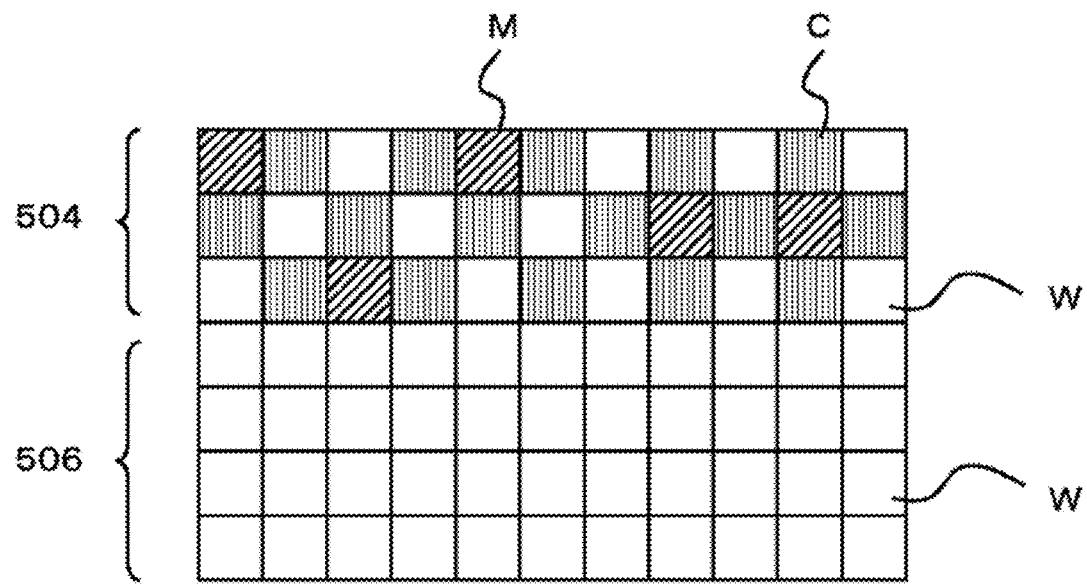

Subsequently, a way of coloring the surface region 502 and the end region 504 will be described in more detail. FIG. 5A and FIG. 5B are views describing a way of coloring the surface region 502 and the end region 504. Furthermore, for the sake of convenience of illustration, in FIG. 5A and FIG. 5B, different hatching patterns are shown for difference in colors. Moreover, in the subsequent drawings as well, illustration is similarly made by appropriately differing the hatching patterns for difference in colors, and the like.

FIG. 5A shows an example of a way of coloring the surface region 502. As described above, in the present example, at least a portion of the surface region 502 is formed in a colored state. Furthermore, in the following, a portion that is colored in the surface region 502 is referred to as a surface colored portion. When the entire surface region 502 is formed in a colored state, the entire surface region 502 can be considered as a surface colored portion. In the present example, the surface color method (surface coloring method) is used as a way of coloring the surface colored portion. In this case, the surface color method can be considered as, for example, a method of coloring the surface overlapping with the light reflective inner region 506.

More specifically, as described above, in the present example, a white ink is used as the inner region 506 to form a white region. In this case, the surface colored portion in the surface region 502 can be considered as, for example, a region in which the color is visually recognized as the color of the inner region 506 functions as a background color. Furthermore, in this case, the surface colored portion needs to be formed so that at least a portion of the light entering from the outside is reflected by the inner region 506 and emitted to the outside. Therefore, it can be considered that the surface colored portion is formed so that, for example, the light entering from the side opposite to the inner region 506 is reflected by the inner region 506 and emitted to the outside of the shaped object. In this case, the light entering from the side opposite to the inner region 506 being reflected by the inner region 506 and emitted to the outside of the shaped object means that, for example, in a state where a portion of the incident light is absorbed into the surface region 502 according to the color to be colored or the like, the component of the light that is not absorbed is emitted. With such a configuration, various colors can be appropriately expressed in the surface colored portion.

Furthermore, more specifically, in the present example, the surface colored portion is formed by using each color ink of YMCK which is a coloring ink selected according to the color to be colored and the clear ink. Then, in this case, each portion of the surface colored portion is formed so that, for example, the total amount of ink per unit volume is constant by differing the ink used among each ink color of YMCK according to the color to be colored, and changing the usage amount of clear ink in accordance with the change in the usage amount of ink that occurs depending on the difference in color. With this configuration, for example, a difference can be appropriately prevented from forming in the amount of ink depending on a difference in color. Furthermore, for example, the formation of the surface region 502 can be appropriately carried out. Moreover, such a way of using the clear ink can be considered as, for example, a way of compensating for a change in the usage amount of the coloring ink. Furthermore, in this case, such a compensation in the surface colored portion can be considered as a compensation by only clear ink.

In this case, it can be considered to form a portion of the surface region 502 that is not colored with only clear ink. Furthermore, a portion formed only with the clear ink can be considered as, for example, a portion that is colored colorless. Moreover, in this case, it can be considered that the entire surface region 502 including a portion to be colored colorless becomes a surface colored portion.

Furthermore, in the present example, the end region 504 is colored through a method different from that of the surface region 502, as described above. FIG. 5B shows an example of a way of coloring the end region 504. As described above, in the present example, at least a portion of the end region 504 is also formed in a colored state. Furthermore, in the following, a portion that is colored in the end region 504 is referred to as an end colored portion. When the entire end region 504 is formed in a colored state, the entire end region 504 can be considered as an end colored portion.

In the present example, a bulk color method (bulk coloring method) is used as a way of coloring the end colored portion. In this case, the bulk color method can be considered as, for example, a method of coloring the region without using another light reflective region. More specifically, in the present example, the end colored portion can be considered as a region where the color is visually recognized as the end colored portion is formed using, for example, a white ink in addition to the coloring ink, and the color of the white ink in the end colored portion functions as the background color. Furthermore, in FIG. 5B, for the sake of convenience of illustration, the end region 504 is illustrated together with the inner region 506 in accordance with FIG. 5A. However, as can be understood from the above description, the end region 504 can be considered as a region where colors can be visually recognized from the outside without the inner region 506.

Moreover, for example, it can be considered that the end colored portion is formed to have higher light reflectivity than the surface colored portion by using coloring ink and white ink. In this case, the end colored portion having higher light reflectivity than the surface colored portion means that, for example, the content of the white ink per unit volume is greater than that of the surface colored portion. Regarding the end colored portion, which has higher light reflectivity than the surface colored portion, for example, it can be considered that the end colored portion has higher light reflectivity than the region colored through the surface color method and has sufficient light reflectivity to perform coloring through the bulk color method. Furthermore, in this case, the end region 504 can also be considered as, for example, a region in which color is expressed using the light reflected by the end region 504 itself by increasing the light reflectivity of the end colored portion. With such a configuration, various colors can be appropriately expressed in the end colored portion with a configuration different from the surface colored portion.

More specifically, in the present example, the end colored portion is formed by using each color ink of YMCK, which is a coloring ink selected according to the color to be colored, and a white ink. Then, in this case, each portion of the end colored portion is formed so that, for example, the total amount of ink per unit volume is constant by differing the ink used among each ink color of YMCK according to the color to be colored, and changing the usage amount of white ink in accordance with the change in the usage amount of ink that occurs depending on the difference in color. With this configuration, for example, a difference can be appropriately prevented from forming in the amount of ink depending on a difference in color. Furthermore, for example, the formation of the end region 504 can be appropriately carried out. Moreover, such a way of using the white ink can be considered as, for example, a way of compensating for a change in the usage amount of the coloring ink.

In the present example, the way of coloring by the bulk color method can be considered as a method of using white ink instead of the clear ink in the surface color method. Furthermore, in a modified example in the way of coloring through the bulk color method, clear ink may be further used in addition to the coloring ink and the white ink. In this case, it is conceivable to use a white ink instead of the clear ink only at some positions where the clear ink is used in the surface color method. Furthermore, in this case, the operation of changing the usage amount of the white ink in accordance with the change in the usage amount of the ink that occurs depending on the difference in color at each position of the end colored portion can be considered as, for example, the operation of changing the usage amount of the white ink according to one portion of the change in the usage amount of the coloring ink. In this case, it is conceivable that the total amount of ink per unit volume becomes constant by changing the total amount of white ink and clear ink according to the change in the usage amount of the coloring ink. Furthermore, in a further modified example in the way of coloring through the bulk color method, consideration is made to perform coloring using a color cell composed of a plurality of ink dots of a predetermined number. The coloring method using the color cell will be described in more detail later.

In addition, it is conceivable that the uncolored portion of the end region 504 is formed using, for example, clear ink or white ink. Furthermore, a portion formed only with the clear ink or the white ink can be considered as, for example, a portion that is colored colorless. Moreover, in this case, it can be considered that the entire end region 504 including a portion to be colored colorless becomes an end colored portion.

The color of the end colored portion is preferably, for example, a color matched with the surface colored portion. In this case, the color matched with the surface colored portion is, for example, the same color as the position in contact with the end colored portion in the surface colored portion. Furthermore, in this case, it can be considered that the way of coloring is changed in a state where the color is the same at the boundary portion where the surface colored portion and the end region come into contact with each other. Furthermore, more specifically, the end colored portion is, for example, at least a portion of a portion that lies along the edge of the surface region 502 in the end region 504, and is connected to the surface colored portion at the edge of the surface region 502. Then, in this case, it is conceivable that a portion of the end colored portion connecting to the surface colored portion is formed in a state of being colored according to the color of the surface colored portion at the edge of the surface region. It is also conceivable that the end colored portion is colored with the color depth and the like made different from that of the surface colored portion.

According to the present example, for example, the surface region 502 and the end region 504 can be appropriately colored through different methods. As a result, for example, as will be described below, the way the color is seen can be made different for the surface region 502 and the end region 504.

Figure 6A:
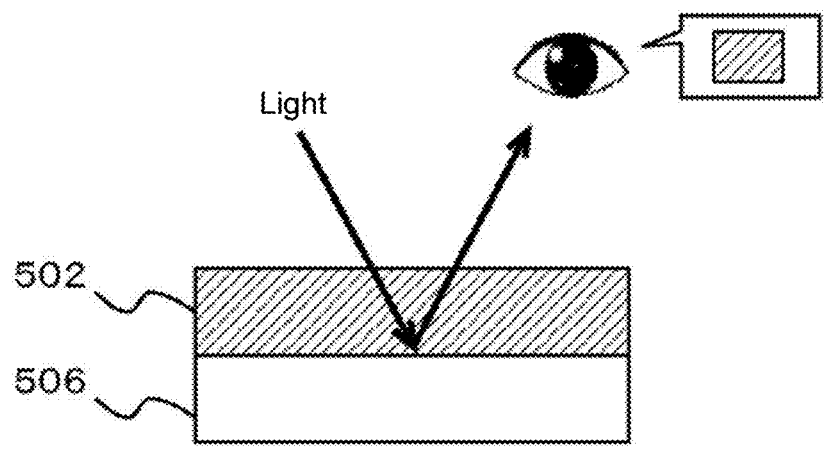
FIG. 6A to FIG. 6C are views describing a way the color of the surface region 502 and the end region 504 is seen.
Figure 6B:
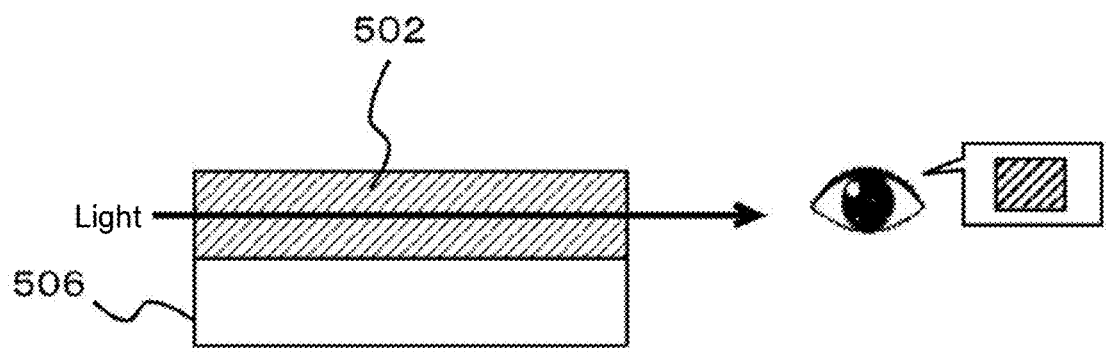
Figure 6C:
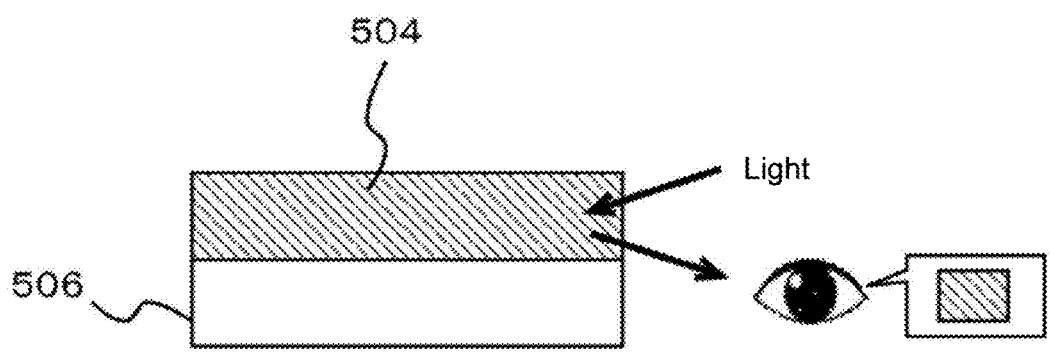

FIG. 6A to FIG. 6C are views describing a way the color of the surface region 502 and the end region 504 is seen. FIG. 6A is a view showing an example of a way the color of the surface region 502 is seen. As described above, in the present example, the surface region 502 is colored by the surface color method. Then, in this case, as shown in the figure, the light that externally entered the surface region 502 is reflected by the inner region 506 and emitted to the outside of the surface region 502. An observer who observes the shaped object 50 visually recognizes the color of the surface region 502 when the reflected light reaches the eyes. Furthermore, in this case, each portion of the surface region 502 is colored according to the way the color is seen.

However, depending on the angle at which the surface region 502 is observed, it is conceivable that light that is not reflected by the inner region 506 reaches the eyes of the observer, for example, as shown in FIG. 6B. FIG. 6B is a view describing the influence of the angle at which the surface region 502 is observed. As shown in the figure, when the surface region 502 is observed from a direction orthogonal to the thickness direction of the surface region 502, for example, it can be considered that the light advancing without being reflected by the inner region 506 reaches the eyes of an observer. In this case, more light is absorbed in the surface region 502 as the distance in which the light passes through the surface region 502 is longer than that shown in FIG. 6A, and change may occur in the way the color is seen. More specifically, in this case, the color of the surface region 502 may be visually recognized as a color darker than the original color.

Furthermore, for the same reason, if the end region 504 of the shaped object 50 is colored through the surface color method, it is considered that the way the color of the end colored portion is seen is similar to the case shown in FIG. 6B. In this case, it can be considered that since the color of the boundary portion (connecting portion) of the shaped object 50 used as a parts is visually recognized as a dark color, the boundary portion may appear like an edge, and stripes or contours may be visually recognized at the boundary portion. As a result, the quality of the object 40 (see FIG. 1) may be affected. On the other hand, in the present example, such a problem is prevented by coloring the end colored portion by performing the bulk color method.

FIG. 6C is a view showing an example of a way the color of the end region 504 is seen in the present example. As described above, in the present example, the end region 504 is colored by the bulk color method. In this case, as shown in the drawing, the light that externally entered the end region 504 is reflected in the end region 504 and emitted to the outside of the end region 504. Then, in this case, even if the angle at which the end region 504 is observed changes, a difference is less likely to occur in the distance in which light passes through the end region 504.

Therefore, in this case, for example, the color of the end region 504 can be appropriately prevented from being visually recognized as a dark color. Furthermore, for example, stripes and contours can be appropriately prevented from standing out at the boundary portion of the shaped object 50 used as a parts. Therefore, according to the present example, for example, it is possible to appropriately prevent the appearance of the object 40 from being affected by the color of the end region 504 for the object 40 created by combining the shaped object 50. Further, for example, the shaped object 50 can be more appropriately shaped so as to appropriately enhance the visibility of the connecting location of the shaped object 50 used as a parts.

Here, regarding the coloring of the shaped object 50, if consideration is made to merely prevent stripes and contours from being conspicuous at the boundary portion of the shaped object 50, it may seem possible to color the surface region 502 by the bulk color method. However, when the coloring by the bulk coloring method is performed, the range of expressible colors may be smaller than that of the surface coloring method. As a result, it may be difficult to perform coloring of high color developing property on the surface region 502, which is a portion exposed on the surface after the object 40 is completed. On the other hand, according to the present example, for example, coloring through a method that obtains high color developing property can be appropriately performed on the portion exposed on the surface after the object 40 is completed by coloring the surface region 502 through the surface color method.

Furthermore, in this case, after the completion of the object 40, even if the color developing property lowers to a certain extent in the end region 504 that is hidden inside the object 40, a large problem is unlikely to occur. Furthermore, by coloring the end region 504 by the bulk color method, stripes and contours can be prevented from being conspicuous at the boundary portion of the shaped object 50 as described above. Therefore, according to the present example, the surface region 502 and the end region 504 can be appropriately colored through a method suitable for each region.

Figure 7A:
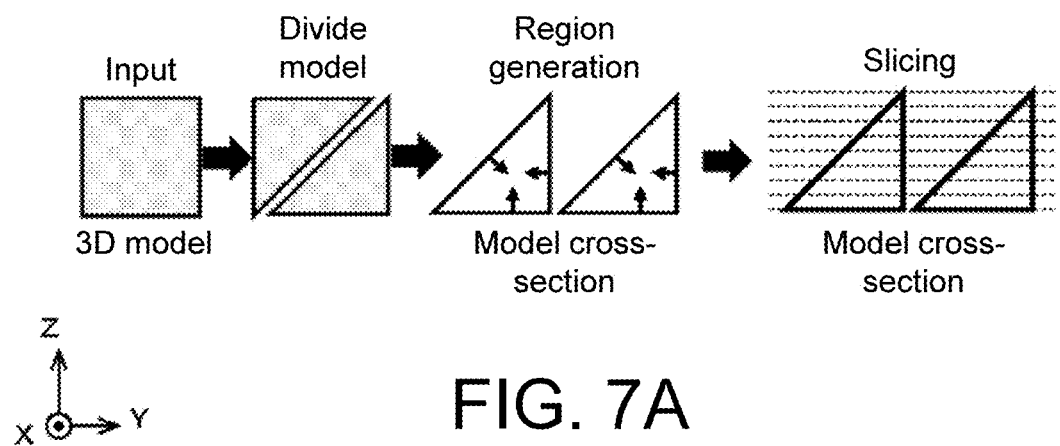
FIG. 7A to FIG. 7C are views showing an example of an operation of creating an object 40.
Figure 7B:
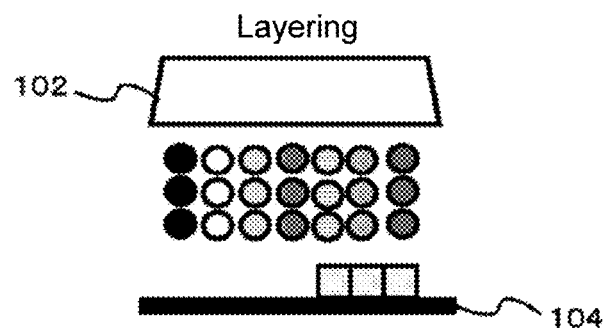
Figure 7C:
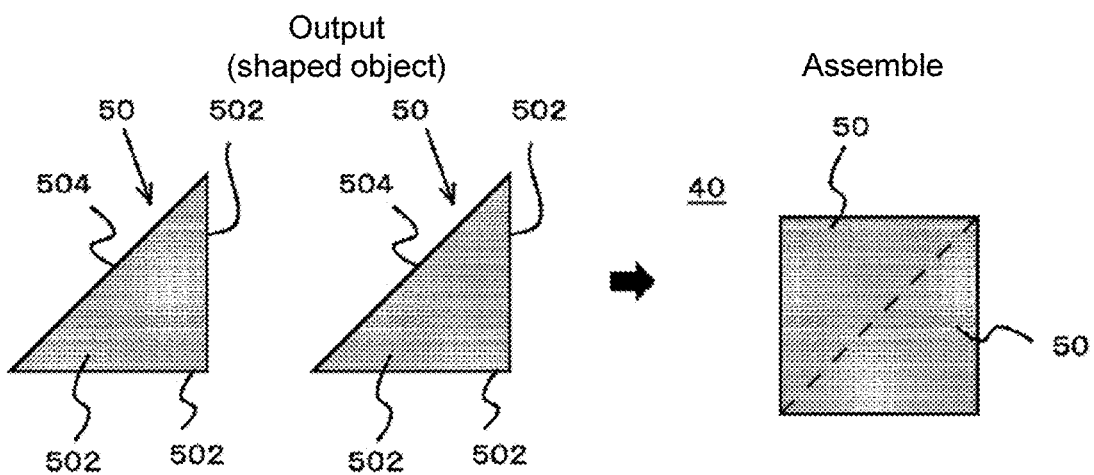

Next, the operation of creating the object 40 in the present example will be described in more detail. FIG. 7A to FIG. 7C are views showing an example of an operation of creating the object 40. FIG. 7A shows an example of the operation until immediately before the shaping of the shaped object 50 is started in the shaping device 12 (see FIG. 2A to FIG. 2C). In this case, starting the shaping of the shaped object 50 in the shaping device 12 means starting the formation of an ink layer that forms the shaped object 50. FIG. 7B shows an example of an operation of performing shaping of the shaped object 50 in the shaping device 12. FIG. 7C shows an example of the operation after the shaping of the shaped object 50 by the shaping device 12 is completed.

As described above, in the present example, the object 40 is created by combining a plurality of shaped objects 50 used as parts. Then, in this case, first, data indicating the object 40 is prepared, and this data is divided to create data indicating the respective shaped objects 50. The data indicating the object 40 is data indicating the overall shape and color of the object 40, for example, as shown as a 3D model in FIG. 7A. The data indicating the object 40 can be considered, for example, as input data before division. Furthermore, as the data indicating the object 40, three-dimensional data (3D data) in a known format can be suitably used. In this case, the color of the object 40 is, for example, the color of the surface of the object 40. It can be considered that the color of the surface of the object 40 may be set, for example, by pasting a texture indicating a color image on the surface of the shape data indicating the three-dimensional shape of the object 40.

Furthermore, in the present example, as shown as an operation of dividing the model in the figure, data indicating a plurality of shaped objects 50 respectively corresponding to the respective parts forming the object 40 is generated by dividing the data indicating the object 40. In this case, for example, it is conceivable to generate data indicating the respective shaped objects 50 by dividing the object 40 according to a user's instruction. Furthermore, in the present example, as the data indicating each of the shaped objects 50, shaping data which is data indicating the shape and color of the shaped object 50, and a coloring method designating data which is data indicating the way of coloring each position of the shaped object 50. As the shaping data, for example, three-dimensional data in a known format can be suitably used. The shaping data and the coloring method designating data will be described in more detail later.

Furthermore, in the present example, the control PC 14 (see FIG. 2A to FIG. 2C) in the shaping system 10 generates the shaping data and the coloring method designating data. Then, these generated data are provided to the shaping device 12. Therefore, in the present example, the shaping data and the coloring method designating data can be considered as an example of the input data indicating the shaped object 50 to be shaped in the shaping device 12. Moreover, the operation of dividing the model to generate the plurality of shaped objects 50 may be automatically performed by the control PC 14.

The shaping device 12 (see FIG. 2A to FIG. 2C) that received the shaping data and the coloring method designating data generates data indicating the shaped object 50 in a format suitable for the shaping operation based on these data. More specifically, in this case, the controller 110 (see FIG. 2A to FIG. 2C) in the shaping device 12 generates each region (surface region 502, end region 504, inner region 506) that forms the shaped object 50 based on the shaping data and the coloring method designating data. In this case, the controller 110 determines, for example, for each position on the surface of the shaped object 50, which of the surface region 502 and the end region 504 the position corresponds to, based on the coloring method designating data. Furthermore, based on this determination, the surface region 502 and the end region 504 are generated so as be a region having a predetermined thickness. Then, a portion other than the surface region 502 and the end region 504 is set as the inner region 506. The controller 110 further generates slice data indicating the cross-section of the shaped object 50 at the position of each ink layer, in accordance with the thickness of the ink layer to be layered in the shaping device 12 based on the generation result of the region.

Here, the process of generating the region and generating the slice data (process of slicing) performed as described above can be carried out in the same or similar manner as a known operation except for the operation of designating the way of coloring using the coloring method designating data. Furthermore, in this case, in the slicing process, for example, the slice data is generated in accordance with the structure of the shaping device 12 by appropriately performing resolution conversion according to the resolution of shaping, color separation according to the color of the ink to be used, halftone processing, and the like. Moreover, in a modified example of the operation of creating the object 40, for example, the process of generating the region and slicing may be performed by the control PC 14. In a further modified example of the operation of creating the object 40, for example, it is conceivable that the operation of dividing the model to generate a plurality of shaped objects 50 is performed by the shaping device 12.

After the slice data is generated, for example, as shown in FIG. 7B, an ink layer is formed in the shaping device 12 by ejecting ink from each inkjet head of the head portion 102 toward the shaping table 104. Furthermore, the shaped object 50 is shaped by forming a plurality of ink layers in an overlapping manner.

Thus, in the shaping device 12, a plurality of shaped objects 50 are shaped, for example, as shown in FIG. 7C. In this case, for example, it is conceivable that the plurality of shaped objects 50 are shaped simultaneously on the shaping table 104. With such a configuration, a plurality of shaped objects 50 can be efficiently shaped. Furthermore, when the number of shaped objects 50 is large, for example, the plurality of shaped objects 50 used as parts of the object 40 may be shaped in a plurality of times.

After the shaping of the plurality of shaped objects 50 is completed, the plurality of shaped objects 50 are combined to create the object 40. In this case, as described above, as the end region 504 is colored by the bulk color method, it can be appropriately shown that stripes and the like stand out at the boundary portion of the shaped object 50 shown with a broken line in the drawing.

Figure 8:
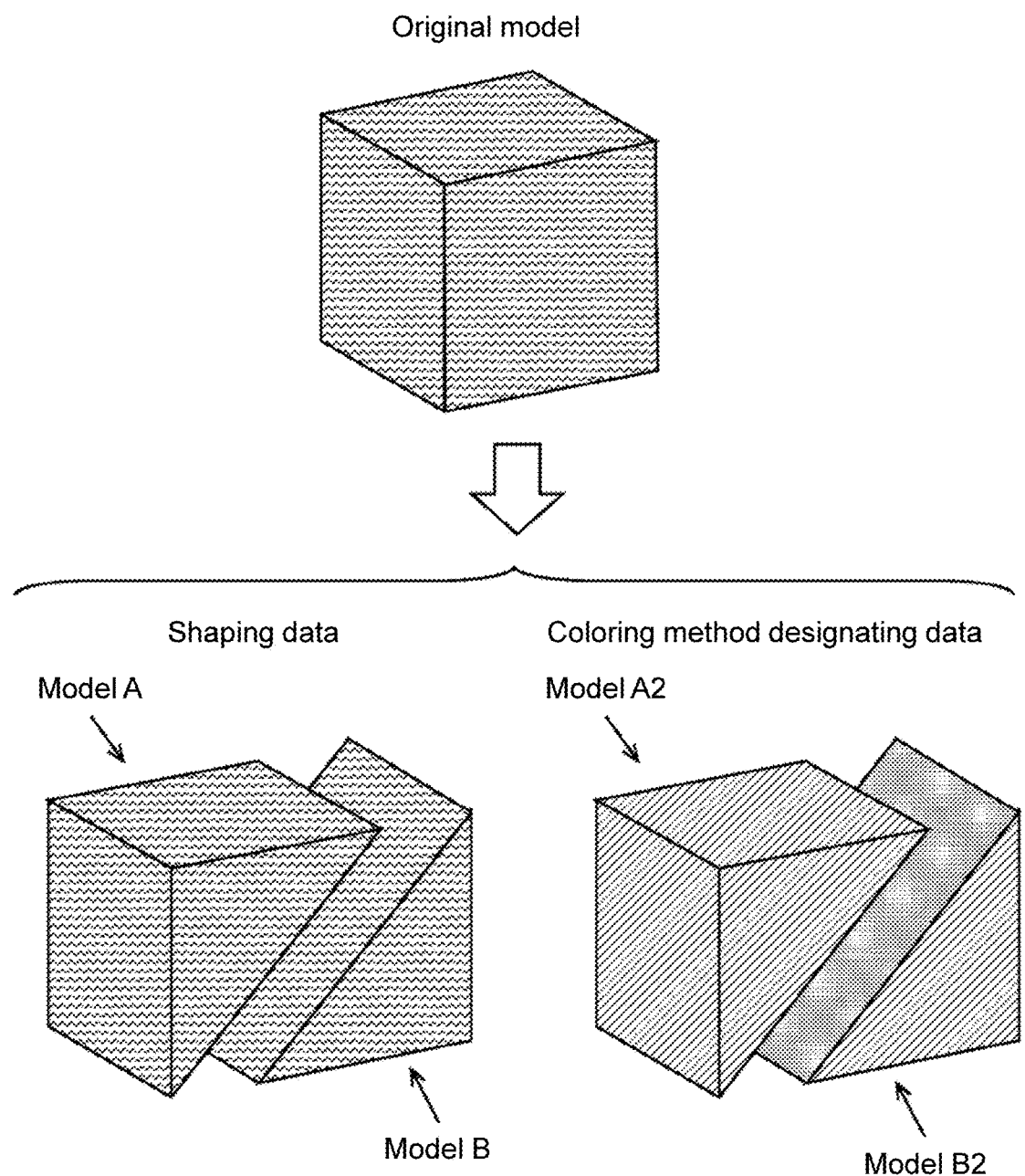
FIG. 8 is a view describing the shaping data and the coloring method designating data in more detail.

Next, the shaping data and the coloring method designating data used in the present example will be described in more detail. FIG. 8 is a view describing the shaping data and the coloring method designating data in more detail. As described above, in the present example, data indicating a plurality of shaped objects 50 respectively corresponding to the respective parts forming the object 40 is generated by dividing the data indicating the object 40. Furthermore, in this case, the shaping data and the coloring method designating data are generated as the data indicating the respective shaped objects 50.

Furthermore, FIG. 8 shows an example of an operation in a case where a cube-shaped object 40 is created similar to a case described using FIG. 3A and FIG. 3B. In this case, as the data indicating the object 40, data indicating a cube shown as the original model in the drawing is used. As the plurality of shaped objects 50 used as parts, two triangular prism-shaped shaped objects 50 obtained by dividing the object 40 into two are shaped.

Furthermore, in this case, as the shaping data corresponding to each shaped object 50, data indicating the shape and color of the shaped object 50 as shown as model A and model B in the drawing is used. Moreover, in the present example, as the shaping data, data in which the surface region 502 and the end region 504 are not distinguished is used. If the surface region 502 and the end region 504 are not distinguished, for example, it means that whether to use the surface color method or the bulk color method for the way of coloring each position is not designated. As such shaping data, it is conceivable to use data in the same format as the data indicating the object 40. In this case, in the shaping data, it can be considered that the end region 504 is designated with a color in the same format as the surface region 502.

Furthermore, in the present example, the way of coloring the surface region 502 and the end region 504 respectively is designated by further using the coloring method designating data. In this case, designating the way of coloring means designating which method, the surface color method or the bulk color method, to use for coloring. With this configuration, for example, the way of coloring for each of the surface region 502 and the end region 504 can be appropriately designated based on the coloring method designating data. Thus, for example, the way of coloring the surface region 502 and the way of coloring the end region 504 can be appropriately made different.

Furthermore, in the present example, the data of the same format as the shaping data is used as the coloring method designating data. Moreover, in this case, in the coloring method designating data, way of coloring is designated by differing the way of using colors from the shaping data. More specifically, in the present example, in the shaping data, color information is used to indicate the color to be colored for each position of the surface region 502 and the end region 504. On the other hand, in the coloring method designating data, color information is used to indicate the way of coloring used at each position. In this case, in the coloring method designating data, for example, the first color and the second color which are different from each other are used, the coloring by the surface color method and the first color are associated with each other, and the coloring by the bulk color method and the second color are associated with each other, so that the way of coloring used at each position can be designated.

More specifically, in this case, it is conceivable to use as the coloring method designating data, for example, data that indicates the shape of the shaped object 50 and in which the first color is set to the position where the coloring by the surface color method is to be performed and the second color is set to the position where the coloring by the bulk color method is to be performed. Furthermore, in this case, it is conceivable to use the coloring method designating data corresponding to the shaping data of model A and model B as shown as model A2 and model B2 in the drawing. In this case, as shown in the figure, in each of the model A2 and the model B2, the designated color is made different between the position corresponding to the surface region 502 and the position corresponding to the end region 504. With this configuration, for example, one shaped object 50 can be colored through different methods depending on the position. Thus, for example, the way of coloring for the surface region 502 and the end region 504 can be appropriately made different.

Moreover, in this case, the coloring method designating data can be handled without separately using a special software, and the like, for example, by using the coloring method designating data in the same format as the shaping data. More specifically, with respect to the coloring method designating data, it is conceivable to designate the way of coloring (e.g., designate position to perform bulk color coloring) by the user designating on software, for example. Then, in this case, the way of coloring can be appropriately designated using the same software as that for designating the color for the shaping data.

Furthermore, when the coloring method designating data is considered in a more generalized manner, for example, it is data in the same format as the shaping data, and can be considered as data indicating the shape of the shaped object 50 and the color associated with at least a portion of the shaped object 50, and the like. Furthermore, in this case, the color indicated by the coloring method designating data can be considered as, for example, a color that is associated in advance with the way of coloring. Moreover, regarding the color indicated by the coloring method designating data, for example, it can be considered that the way of coloring with respect to a position designated with the color is indicated.

Figure 9:
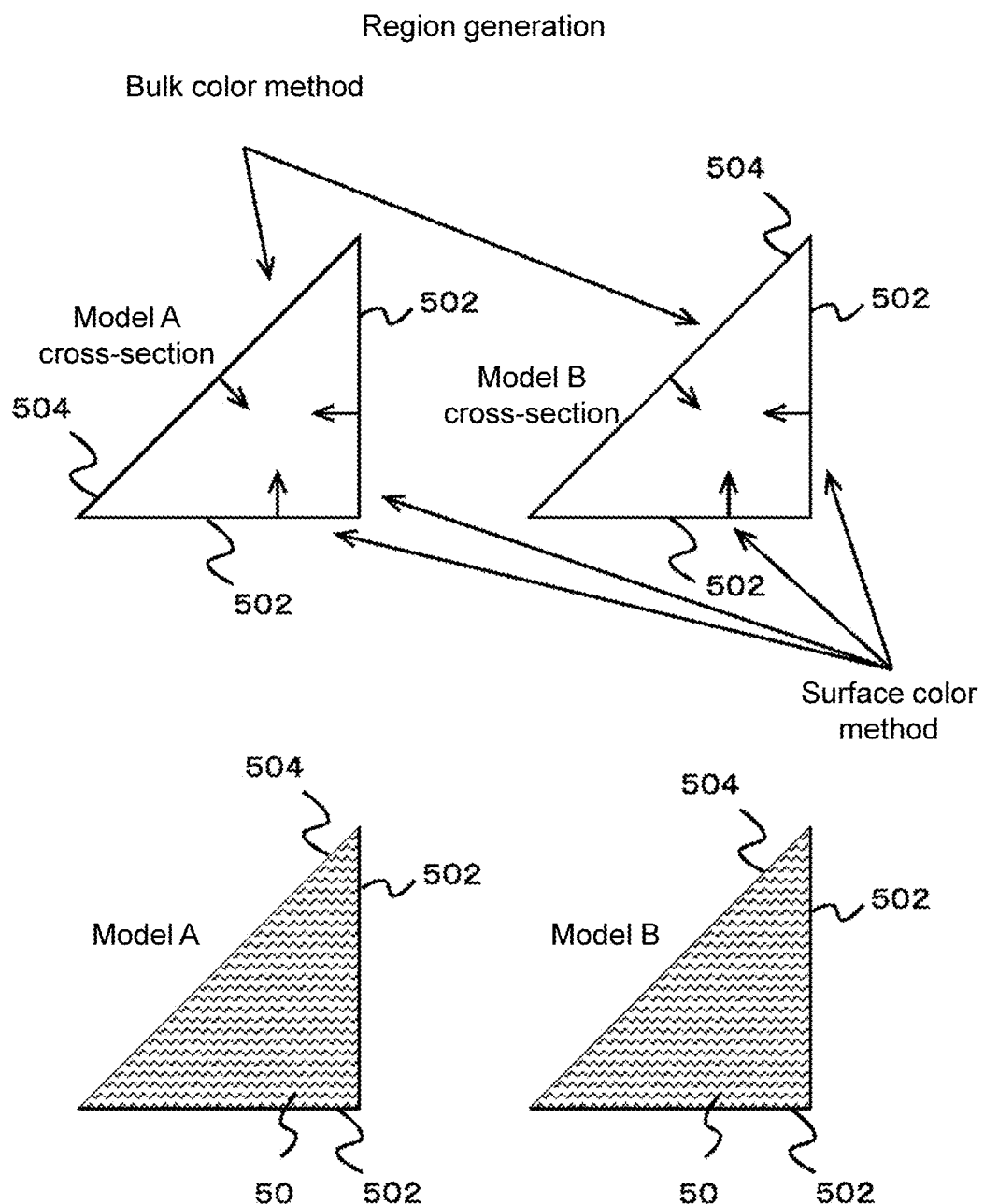
FIG. 9 is a view describing the process of generating each region of the shaped object 50 in more detail.

As described above, in the present example, the process of generating each region of the shaped object 50 is performed based on the shaping data and the coloring method designating data as described above. FIG. 9 is a view describing the process of generating each region of the shaped object 50 in more detail.

As described above, in the present example, the way of coloring is made different depending on the position of the shaped object based on the coloring method designating data. More specifically, for example, in a case of a shaped object corresponding to the model A and the model B in FIG. 8, the way of coloring is designated such that the end region 504 is colored by the bulk color method and the surface region 502 is colored by the surface color method, as shown in the upper portion of FIG. 9. In this case, regions corresponding to the surface region 502 and the end region 504 are generated with a configuration corresponding to the designation in the way of coloring, and slicing process is performed to generate slice data. Furthermore, the shaping device 12 (see FIG. 2A to FIG. 2C) performs the shaping operation based on the generated slice data to shape the shaped object 50 corresponding to the model A and the model B, as shown at the lower portion of FIG. 9. With such a configuration, for example, the shaped object 50 in which the way of coloring is made different between the surface region 502 and the end region 504 can be appropriately shaped.

Next, description on a modified example regarding each configuration described above, supplementary description and the like will be made. In the above description, as an example of a way of coloring the end region 504 by the bulk color method, a method of using a white ink instead of the clear ink in the surface color method, and the like has been described using, for example, FIG. 5B and the like. In this case, it can be considered that the coloring by the bulk color method is performed at the same resolution as the coloring by the surface color method. Furthermore, the resolution of coloring can be considered to be the same as the resolution of shaping. In this case, the resolution of shaping can be considered as, for example, the resolution at which ink is ejected by the inkjet head in the head portion 102 (see FIG. 2A to FIG. 2C). Furthermore, the resolution of coloring can be considered as, for example, the minimum unit resolution for expressing a color. Moreover, the configuration for performing coloring in such a manner can also be considered as, for example, a configuration for performing coloring on the surface region 502 and the end region 504 at the same resolution as the resolution of shaping.

However, in a modified example of a way of coloring by the bulk color method, the resolution of coloring and the resolution of shaping may be different. Furthermore, in this case, for example, it is conceivable that the end region 504 is colored at a resolution lower than the resolution of shaping. In addition, more specifically, in this case, as described above, it is conceivable to color the end region 504 using a color cell.

Figure 10A:
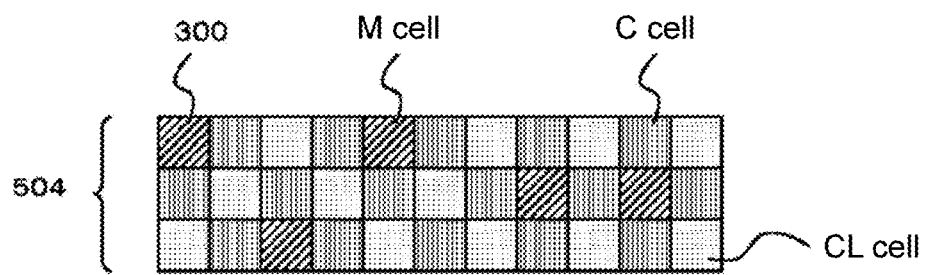
FIG. 10A and FIG. 10B are views describing a modified example of a way of coloring by the bulk color method.
Figure 10B:
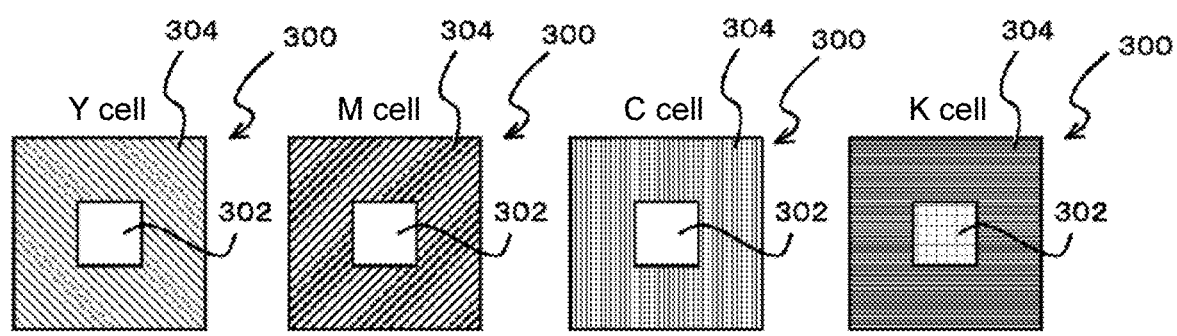
Figure 10B:
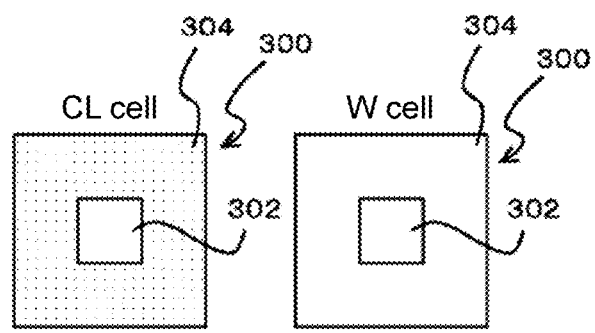
Figure 11A:
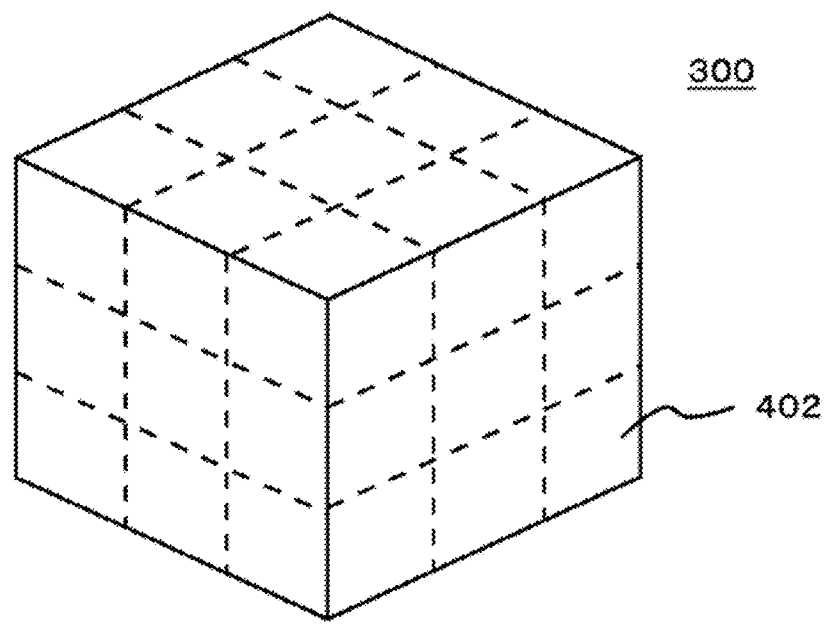
FIG. 11A and FIG. 11B are views describing a modified example of a way of coloring by the bulk color method.
Figure 11B:
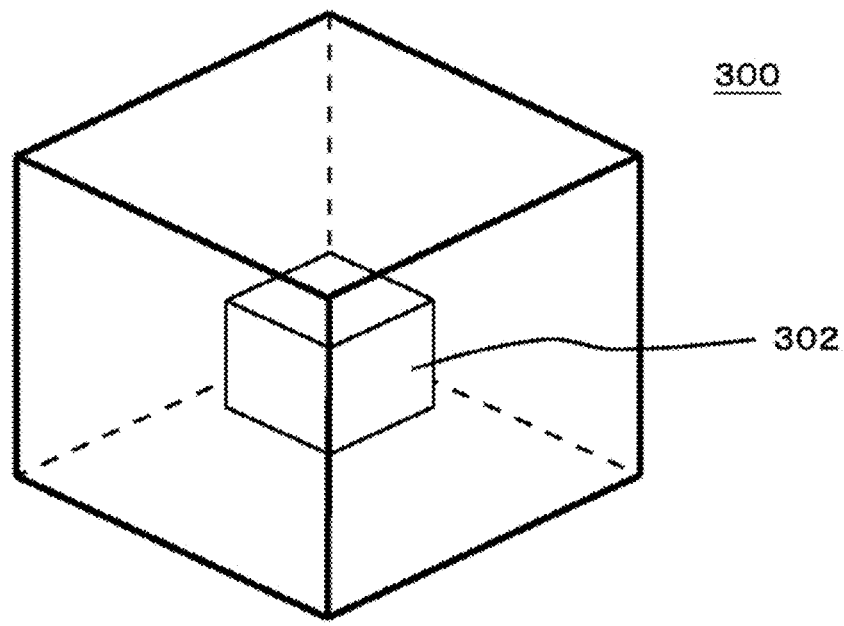

FIGS. 10A, 10B, 11A and 11B are views describing a modified example of the way of coloring by the bulk color method, and show an example of an operation of coloring the end region 504 using a color cell. FIG. 10A is a view showing an example of a configuration of the end region 504 when coloring is performed using a color cell 300, and shows a state in which a plurality of color cells 300 are arranged in the end region 504 in a simplified manner. FIG. 10B shows an example of a configuration of the color cell 300. FIG. 11A and FIG. 11B schematically show the color cell 300 from various viewpoints.

As described above, the color cell 300 is a unit of coloring composed of a plurality of ink dots of a predetermined number. The color cell 300 can be considered as, for example, a unit of coloring having a size obtained by combining a plurality of ink dots. The color cell 300 can also be considered as, for example, a unit or the like set in advance so as to include a plurality of dots formed of the material of the shaped object 50. Furthermore, when the color cell 300 is configured by a plurality of ink dots, for example, a set of a plurality of ink dots can be handled as one color cell 300 in design.

More specifically, as the color cells 300, for example, a configuration is used in which ink dots are arranged by a preset number in each of the main scanning direction, the sub scanning direction, and the layering direction. Furthermore, more specifically, in the case of the present modified example, the number of dots arranged in each direction in one color cell 300 is three. Therefore, one color cell 300 is configured by a total of 27 (3×3×3) ink dots.

In this case, one ink dot can be considered as, for example, a dot formed by an ink ejected by any one nozzle of any one inkjet head to one ejection position set according to the resolution of shaping. Furthermore, the resolution of shaping can be considered as, for example, a resolution for designating the ejection position of the ink at the time of the shaping operation. More specifically, in this case, the resolution of shaping can be considered as, for example, resolution of a position to eject ink in an operation of forming one ink layer in the main scanning direction and the sub scanning direction. In addition, in the layering direction, the resolution of shaping can be considered as, for example, resolution corresponding to the interval of the ink layers to layer.

In this case, one ink dot can also be considered as a configuration or the like corresponding to a voxel set in correspondence with the resolution of shaping. In this case, a voxel is a three-dimensional pixel that forms each position of the shaped object 50 in accordance with the resolution of shaping. Then, in this case, one color cell 300 can be considered as, for example, being formed by 27 voxels 402 as shown in FIG. 11A.

Furthermore, as described above, the color cell 300 is configured of a plurality of ink dots. Therefore, in the present modified example, the resolution (resolution of color cell) with respect to the arrangement of the color cells 300 can be considered in addition to the resolution (resolution of dot) with respect to the arrangement of ink dots. In this case, the resolution of the color cell is a resolution lower than the resolution of the dot in accordance with the number in which the ink dots are arranged in each method in one color cell 300. More specifically, as described above, in the color cell 300 of the present modified example, three ink dots are arranged in each of the main scanning direction, the sub scanning direction, and the layering direction. Therefore, in each direction of the main scanning direction, the sub scanning direction, and the layering direction, the resolution of the color cell 300 is ⅓ of the resolution of the dot.

Furthermore, in the present modified example, the end region 504 is formed by arranging a plurality of color cells 300, for example, as shown in FIG. 10A. Therefore, it can be considered that the resolution of coloring the end region 504 is equal to the resolution of the color cell 300. In this case, the resolution of the dot is a resolution corresponding to the resolution of shaping or the resolution of coloring the surface region 502 (see FIG. 3A and FIG. 3B). Therefore, in the present modified example, it can be considered that the resolution of coloring the end region 504 is ⅓ of the resolution of shaping and the resolution of coloring the surface region 502. In this case, it can be considered that the end region 504 is colored, for example, at a resolution determined according to the size of the color cell 300. Furthermore, for example, it can also be considered to color the surface region 502 at a resolution higher than the end region 504. Then, in this case, for example, the end region 504 can be appropriately colored using the color cell 300 while coloring a portion forming the surface of the object 40 (see FIG. 3A and FIG. 3B) at a high resolution.

In the present modified example, the color cell 300 includes a reflective core 302 and an outer peripheral portion 304, as shown, for example, in FIG. 10B. In this case, the reflective core 302 is a portion formed of white ink inside the color cell 300. The outer peripheral portion 304 is a portion surrounding the periphery of the reflective core 302. More specifically, in the present modified example, among the 27 ink dots forming one color cell 300, the one ink dot located at the center position becomes the reflective core 302. Furthermore, the other 26 ink dots form the outer peripheral portion 304. According to this configuration, for example, a configuration of the smallest size can be appropriately realized as the color cell 300 including the reflective core 302 at the center. Furthermore, in this case, when the color cell 300 is transparently shown so that the reflective core 302 inside can be seen, for example, it becomes as shown in FIG. 11B. It can also be considered that the reflective core 302 is configured by, for example, one ink dot at the center position of the color cell 300.

Furthermore, the outer peripheral portion 304 is formed so as to show the color of the color cell 300 by using coloring ink of each color as necessary. More specifically, in the present modified example, the outer peripheral portion 304 in one color cell 300 is configured by ink dots of any one color. According to such a configuration, for example, the color of the color cell 300 can be appropriately set in accordance with the color of ink to use for shaping. More specifically, in this case, for example, as shown in FIG. 10B, the Y cell which is the color cell 300 of Y color can be configured by forming the outer peripheral portion 304 with ink of Y color. An M cell which is the color cell 300 of M color can be configured by forming the outer peripheral portion 304 with ink of M color. A C cell which is the color cell 300 of C color can be configured by forming the outer peripheral portion 304 with ink of C color. Furthermore, a K cell which is the color cell 300 of K color can be configured by forming the outer peripheral portion 304 with ink of K color. Moreover, in the present modified example, a CL cell and a W cell which are color cells 300 of clear color and white color are further used. In this case, the CL cell can be configured by forming the outer peripheral portion 304 with clear ink. The W cell can be configured by forming the outer peripheral portion 304 with white ink. Moreover, the color cell 300 having such a configuration, for example, can be considered as a dot in which the reflective core 302 is at the center and the periphery thereof is coated with ink of any color (e.g., ink of each color of Y, M, C, K, white color, or clear color), and the like. Furthermore, in this case, the W cell can be considered as, for example, a light reflective color cell in which both the reflective core 302 and the outer peripheral portion 304 are formed of white ink.

Furthermore, in this case, the end region 504 can be colored with a desired color by arranging the color cells 300 of each color in accordance with the color to color to each portion of the end region 504. More specifically, FIG. 10A shows an example of the arrangement of the color cells 300 in the end region 504 for a case where the end region 504 is colored using the C cell and the M cell. Furthermore, in this case, the position where the colored color cell 300 is not formed can be compensated by forming a portion of the end region 504 with the CL cell as necessary. Thus, when coloring various colors with respect to the end region 504, for example, the color cells 300 can be arranged at a constant density with respect to each portion of the end region 504. With this configuration, for example, the end region 504 can be appropriately colored with various colors.

Furthermore, as described above, in the present modified example, each color cell 300 includes the reflective core 302 formed of white ink. In this case, the end region 504 includes dots of white ink at a constant density. Therefore, according to the present modified example, for example, the end region 504 can be appropriately colored by the bulk color method using the white ink. Furthermore, in this case, dots of white ink can be uniformly distributed in the end region 504 by using the color cell 300 including the reflective core 302.

In addition, it is conceivable to further modify the way of forming each portion of the shaped object, and the like. For example, among each of the portions of the shaped object, it is conceivable to form the portions other than the end region 504 using the color cell 300. More specifically, for example, it is conceivable to form the inner region 506 (see FIG. 1) in the shaped object by, for example, arranging the W cells.

Furthermore, as the color cell 300, it is also conceivable to further use a color cell for coloring in the surface color method. In this case, as the color cell 300 for coloring in the surface color method, for example, it is conceivable to use a color cell 300 not including the reflective core 302. In this case, it is conceivable to use dots of clear ink, dots of ink of the color of the color cell 300, or the like instead of the reflective core 302. With this configuration, for example, the surface region 502 can also be formed using the color cell 300. Furthermore, in this case, the process of slicing, and the like can be more easily carried out by setting the resolution of coloring in the surface region 502 and the resolution of coloring in the end region 504 to be the same.

Furthermore, the color and the like for coloring the end region 504 can be variously modified. For example, as described above, the color of the end colored portion in the end region 504 is preferably a color that matches the surface colored portion in the surface region 502. However, depending on the color of the surface colored portion, the quality demanded on the object 40, and the like, it can be considered to have the color of the end colored portion to a color not completely the same as that of the surface colored portion but to a color differed to some extent. In this case, it is also conceivable to adjust the color in consideration of the difference in the way of coloring. Furthermore, it is also conceivable to differ the color strength between the color of the surface colored portion and the color of the end colored portion.

Furthermore, in the above description, a case where the coloring method designating data of the same format as the shaping data is further used has been mainly described for the way of coloring the surface region 502 and the end region 504. However, the way of coloring may be designated by a method different from the above. More specifically, in this case, for example, instead of using the coloring method designating data, which is data different from the shaping data, it is also conceivable to designate the way of coloring with respect to each position of the shaped object in the shaping data.

INDUSTRIAL APPLICABILITY

The present disclosure can be suitably used in, for example, a manufacturing method for the shaped object.

What is claimed is:

1. A manufacturing method for a shaped object for manufacturing a shaped object used as a part when creating on object that is three-dimensional and assembled by combining a plurality of the parts, comprising:
    shaping the shaped object by ejecting a shaping material from an ejection head, and the shaped object including:
        a surface region that forms a portion of a surface of the object in a state where the object is assembled,
        an inner region formed at a position on an inner side of the surface region in the state where the object is assembled, and
        an end region that becomes a region that enters an inside of the object from an edge of the surface region in the state where the object is assembled, the end region being a region at an end on a side of another part inside the object in the state where the object is assembled,
    forming at least a portion of each of the surface region and the end region in a colored state using a coloring material,
    forming the inner region to become a light reflective region using a light reflective material,
    forming a surface colored portion, which is a portion to be colored in the surface region, so that a light entering from a side opposite to the inner region is reflected by the inner region to an outside of the shaped object, and
    forming an end colored portion, which is a portion to be colored in the end region, using the coloring material and the light reflective material, so that a light reflectivity of the end colored portion is higher than that of the surface colored portion.

2. The manufacturing method for the shaped object according to claim 1, wherein
    the surface colored portion is a region where a color is visually recognized as a color of the inner region functions as a background color, and
    the end colored portion is a region where a color is visually recognized as a color of the light reflective material in the end colored portion functions as a background color.

3. The manufacturing method for the shaped object according to claim 1, wherein
    as the ejection head,
        a plurality of coloring heads that respectively eject the coloring materials of different colors,
        a light reflective material head that ejects the light reflective material, and a clear material head that ejects a clear color material, are used, wherein the surface colored portion is formed using the coloring material selected according to a color to be colored and the clear color material, and the end colored portion is formed using the coloring material selected according to the color to be colored and the light reflective material.

4. The manufacturing method for the shaped object according to claim 3, wherein each portion of the surface colored portion is formed by differing the coloring material used according to the color to be colored and changing a usage amount of the clear color material in accordance with change in usage amount of the coloring material caused by difference in color, so that a total amount of the coloring material and the clear color material per unit volume becomes constant, and each portion of the end colored portion is formed by differing the coloring material used according to the color to be colored and changing a usage amount of the light reflective material in accordance with at least a portion of change in usage amount of the coloring material caused by difference in color, so that a total amount of the coloring material and the light reflective material per unit volume becomes constant.

5. The manufacturing method for the shaped object according to claim 2, wherein as the ejection head, a plurality of coloring heads that respectively eject the coloring materials of different colors, a light reflective material head that ejects the light reflective material, and a clear material head that ejects a clear color material, are used, wherein the surface colored portion is formed using the coloring material selected according to a color to be colored and the clear color material, and the end colored portion is formed using the coloring material selected according to the color to be colored and the light reflective material.

6. The manufacturing method for the shaped object according to claim 5, wherein each portion of the surface colored portion is formed by differing the coloring material used according to the color to be colored and changing a usage amount of the clear color material in accordance with change in usage amount of the coloring material caused by difference in color, so that a total amount of the coloring material and the clear color material per unit volume becomes constant, and each portion of the end colored portion is formed by differing the coloring material used according to the color to be colored and changing a usage amount of the light reflective material in accordance with at least a portion of change in usage amount of the coloring material caused by difference in color, so that a total amount of the coloring material and the light reflective material per unit volume becomes constant.

7. The manufacturing method for the shaped object according to claim 1, wherein the end colored portion is formed by arranging a plurality of color cells set in advance as a unit of coloring, and each color cell includes:

a reflective core which is a portion formed by the light reflective material inside the color cell, and an outer peripheral portion which is a portion that surrounds a periphery of the reflective core and that is formed to indicate a color of the color cell.

8. The manufacturing method for the shaped object according to claim 7, wherein the end colored portion is colored at a resolution determined according to a size of the color cell, and the surface colored portion is colored at a resolution higher than that of the end colored portion.

9. The manufacturing method for the shaped object according to claim 1, wherein a coloring method designating data, which is data indicating a way of coloring each position of the shaped object, is used, and a way of coloring the surface colored portion and a way of coloring the end colored portion are made different based on the coloring method designating data.

10. The manufacturing method for the shaped object according to claim 9, wherein a shaping data, which is data indicating shape and color of the shaped object to be shaped and indicating a color to be colored for each position of the surface colored portion and the end colored portion, is further used, the coloring method designating data is data of the same format as the shaping data, and indicates the shape of the shaped object and the color associated with at least a portion of the shaped object, and the color indicated by the coloring method designating data is a color that is associated in advance with a way of coloring and the way of coloring with respect to a position designated with the color is indicated.

11. A shaping device for a shaped object used as a part when creating an object that is three-dimensional and assembled by combining a plurality of the parts, and the shaping device comprising:

a coloring head which is an ejection head that ejects a coloring material;

a light reflective material head which is an ejection head that ejects a light reflective material; and a controller having a processor configured to control operations of the coloring head and the light reflective material head, wherein the shaped object includes:

a surface region that forms a portion of a surface of the object in a state where the object is assembled, an inner region formed at a position on an inner side of the surface region in the state where the object is assembled, and an end region that becomes a region that enters an inside of the object from an edge of the surface region in the state where the object is assembled, the end region being a region at an end on another parts side inside the object in the state where the object is assembled, wherein at least a portion of each of the surface region and the end region is formed in a colored state using the coloring material, the inner region is formed to become a light reflective region using the light reflective material, a surface colored portion, which is a portion to be colored in the surface region, is formed so that a light entering from a side opposite to the inner region is reflected by the inner region to an outside of the shaped object, and an end colored portion, which is a portion to be colored in the end region, is formed to have a light reflectivity higher than that of the surface colored portion using the coloring material and the light reflective material.

\* \* \* \* \*